United States Patent
Zhou et al.

(10) Patent No.: US 12,478,938 B2
(45) Date of Patent: Nov. 25, 2025

(54) DYNAMIC CATALYTIC CONVERSION REACTOR AND SYSTEMS AND METHODS USING THE SAME

(71) Applicant: Air Company Holdings, Inc., Brooklyn, NY (US)

(72) Inventors: Lubo Zhou, Deer Park, IL (US); Chi Chen, Shrewsbury, MA (US); Nicholas James Steinke, Brooklyn, NY (US); Richard Isherwood, Weehawken, NJ (US); Jagan Reddy, Brooklyn, NY (US); Konstantina Kritikos, Brooklyn, NY (US); Jihad Dakka, Whitehouse Station, NJ (US); Doug Stewart, Brooklyn, NY (US); Stafford W. Sheehan, Tiverton, RI (US); Zhanping Xu, Inverness, IL (US); Ouda Salem, Freiburg im Breisgau (DE)

(73) Assignee: Air Company Holdings, Inc., Brooklyn, NY (US)

( * ) Notice: Subject to any disclaimer, the term of this patent is extended or adjusted under 35 U.S.C. 154(b) by 0 days.

(21) Appl. No.: 19/033,807

(22) Filed: Jan. 22, 2025

(65) Prior Publication Data

US 2025/0235840 A1    Jul. 24, 2025

Related U.S. Application Data

(60) Provisional application No. 63/656,882, filed on Jun. 6, 2024, provisional application No. 63/642,447, filed
(Continued)

(51) Int. Cl.
*B01J 8/06* (2006.01)
*C25B 15/08* (2006.01)

(52) U.S. Cl.
CPC ............... *B01J 8/065* (2013.01); *B01J 8/067* (2013.01); *C25B 15/081* (2021.01); *B01J 2208/021* (2013.01); *B01J 2208/065* (2013.01)

(58) Field of Classification Search
CPC ......... B01J 8/00; B01J 8/02; B01J 8/06; B01J 8/065; B01J 8/067; B01J 2208/00;
(Continued)

(56) References Cited

U.S. PATENT DOCUMENTS 4,594,227 A * 6/1986 Ohsaki .................. B01J 8/0285
                                                          422/216
7,846,417 B2 * 12/2010 Singh .................... C01C 1/0482
                                                          562/512

(Continued)

FOREIGN PATENT DOCUMENTS

EP          3199231 A1    8/2017
WO    WO-2024/086300 A1    4/2024

OTHER PUBLICATIONS

International Search Report and Written Opinion for International Application No. PCT/US25/12504 dated May 6, 2025.

*Primary Examiner* — Natasha E Young
(74) *Attorney, Agent, or Firm* — Foley Hoag LLP; Lucas P. Watkins; Tatiana P. Headrick

(57) ABSTRACT

A dynamic catalytic conversion reactor having a plurality of operating zones is disclosed that adjusts operation based on incoming hydrogen from a fluctuating renewable energy source. The dynamic reactor is configured to turn on and off supply of feed gas to certain zones based on hydrogen supply, and maintains catalyst activity within all operating and idle zones by applying one of a number of gas flow options through the idle zones. Methods and systems of using the dynamic reactor are also disclosed.

24 Claims, 13 Drawing Sheets

Related U.S. Application Data on May 3, 2024, provisional application No. 63/624,148, filed on Jan. 23, 2024.

(58) Field of Classification Search
CPC .............. B01J 2208/02; B01J 2208/021; B01J 2208/06; B01J 2208/065; C25B 15/00; C25B 15/08; C25B 15/081
See application file for complete search history.

(56) References Cited

U.S. PATENT DOCUMENTS

| | | |
|---|---|---|
| 11,773,039 B2 | 10/2023 | Garapati et al. |
| 2006/0248800 A1 | 11/2006 | Miglin et al. |
| 2008/0056964 A1 | 3/2008 | Singh et al. |
| 2008/0146683 A1 | 6/2008 | Steynberg et al. |
| 2023/0256423 A1 | 8/2023 | Sheehan et al. |

\* cited by examiner

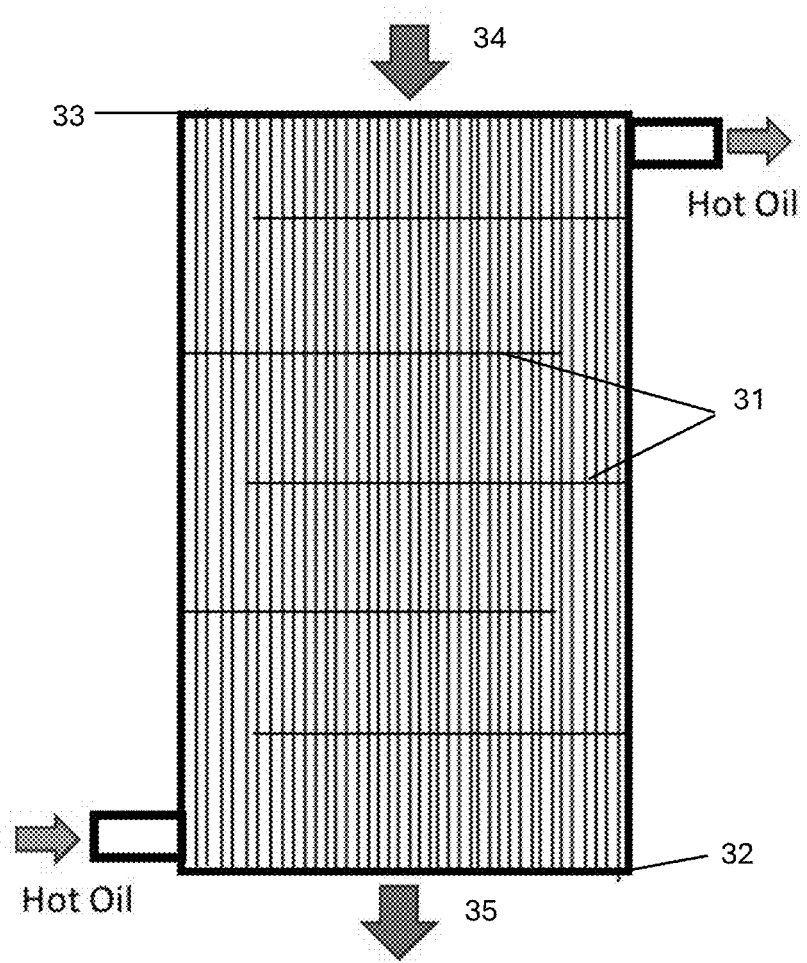

DYNAMIC CATALYTIC CONVERSION REACTOR AND SYSTEMS AND METHODS USING THE SAME

CROSS-REFERENCE TO RELATED APPLICATIONS

This application claims the benefit of priority of U.S. Provisional Application No. 63/624,148, filed on Jan. 23, 2024, U.S. Provisional Application No. 63/642,447, filed on May 3, 2024, and U.S. Provisional Application No. 63/656,882, filed on Jun. 6, 2024. The entire contents of each of the foregoing applications is incorporated by reference herein.

FIELD OF THE DISCLOSURE

This disclosure relates to a catalytic reactor for chemical reactions, which utilizes renewable energy and adjusts its mode of operation based on the supply of energy, and systems and methods incorporating the same.

BACKGROUND

Catalytic reactors for gas phase reactions are usually operated at steady-state mode. For $CO_2$ hydrogenation, if green hydrogen is required, the thermal catalytic reaction will require steady-state green hydrogen supply. It requires significant amounts of energy and energy storage to achieve such operation since renewable electricity output such as solar and wind fluctuates. Hence, the utilization of renewable electricity, e.g., from solar or wind power, with catalytic reactors has an inherent problem with providing steady-state electricity. Large scale energy storage has been required to store electricity so that it can output steady state electricity. Storing electricity in this way, however, significantly increases the cost of electricity generation. There is another issue with hydrogen storage even if hydrogen generators can follow the variable renewable energy (VRE) trends. Due to its extremely low density, hydrogen storage will require either liquefaction of hydrogen or extremely high-pressure compression. Hence, hydrogen storage is very costly and will significantly increase the cost of sustainable chemicals and fuel production.

In contrast to these high electricity costs, in early 2024, it was reported that in China the cost of solar power from a solar field is about $0.020 per kWh, while the cost of renewable power from the grid will be several times larger. In the US, the cost of electricity from solar field is slightly higher than that in China. However, when renewable electricity comes from the grid, the price of electricity is significantly higher than the cost of electricity directly from solar field, e.g., ranging from $0.06-0.12/kWh. Also, solar or wind power generators generate direct current (DC), which needs to be converted into AC (for power transportation), and then back into DC to make green hydrogen from water electrolysis. This repeated conversion yields a net energy loss compared to using direct current (DC).

There are ways to utilize renewable energy in the process of $CO_2$ conversion chemistry. One way is a thermal catalytic process of $CO_2$ hydrogenation using green hydrogen from water electrolysis using renewable electricity. The other way is $CO_2$ electrochemical reduction into chemical commodities, notably carbon monoxide, ethanol, formic acid, and ethylene. This latter process of $CO_2$ electrolysis is still in the early stages of development and scale up is still facing big challenges.

In recent years, thermal catalytic technologies have made significant progress. Demonstration units for $CO_2$ hydrogenation to make methanol have been built and are in operation today. However, most of these technologies are all operated in a steady-state mode and require constant delivery of green hydrogen to the $CO_2$ hydrogenation reactors. State of the art Proton Exchange Membrane (PEM) industrial water electrolysis to produce hydrogen can be operated under dynamic feed conditions in response to the renewable power output as the startup. Also, shut down of the electrolysis system is much easier. In addition, the turndown ratio of water electrolysis can be very large.

Multitubular reactors are usually used for the catalytic gas-phase reactions over fixed-bed catalysts for exothermic reactions such as $CO_2$ hydrogenation. A heat transfer medium is circulated through the space between the uppermost and bottommost tube plates and surrounding the catalyst tubes. The outer wall of the multitubular reactor has means for feeding in and discharging the heat transfer medium, usually suitable annular inlet and outlet channels through which the heat transfer medium is circulated by means of suitable pumps. After leaving the multitube reactor, the heat transfer medium is again brought to a prescribed temperature, for example in an external heat exchanger, before it re-enters the reactor. As far as exothermic reactions are concerned, cooling may be applied for reactor temperature control as well. The multitubular reactors used in industrial production processes often have a shell diameter of several meters. In the case of a multitubular reactor having a diameter of several meters, the number of catalyst tubes arranged within the reactor is usually in the range from 1,000 to 50,000.

A significant challenge in the transition from traditional fossil fuel-based jet fuel to sustainable aviation fuels (SAF) is the high cost of Power-to-X (PtX) process, which converts renewable energy sources, like wind or solar power, biomass gasification, or pyrolysis, into different forms of energy or materials. The majority of the high PtX cost of production for SAF is due to the high cost of production of green hydrogen using water electrolysis. Renewable electricity such as electricity made from solar energy or windmills is not stable. In order to stabilize the grid, large amount of peak electricity from windmills and solar panels has been thrown away, or a large energy storage system has to be installed to control the output of the renewable electricity. The waste of electricity or energy storage is a large part of the cost of renewable power. Hence, it is of great interest to be able to avoid energy storage and fully utilize transient renewable electricity, for example, with PtX to utilize the less expensive renewable electricity from the isolated renewable electricity fields.

The challenge of using electricity from the isolated solar field and windmill is the transient characteristics of the electricity. PEM water electrolysis system is predicted to be able to handle transient electricity due to its room temperature operation, multi-stack arrangement, and fast responding time. Hence, it is possible to use transient electricity to generate green hydrogen, but the output of the hydrogen becomes transient since it is costly to store the hydrogen as it is the lowest density gas in the world.

There exists a need to develop a catalytic reactor that can operate using renewable energy directly, and adjust throughput based on the fluctuating nature of renewable energy generation followed by fluctuating hydrogen generators (e.g. PEM).

SUMMARY

A dynamic catalytic conversion reactor is disclosed. The dynamic catalytic conversion reactor includes: an outer wall having an inner portion filled with a plurality of tubes arranged in parallel to the longitudinal axis of the outer wall; a catalyst within the plurality of tubes; and a plurality of separating sheets within the outer wall. The separating sheets may extend radially outward from a center circular separating sheet. The separating sheets may be linear or circular. The separating sheets divide the inner portion of the outer wall into a plurality of zones, and each zone comprises a portion of the plurality of tubes. The zones may be of the same size or of differing sizes. The zones may be connected to the reactor by pipes extending from the top and bottom of the zones and connecting to the top and bottom, respectively of the reactor. The dynamic catalytic conversion reactor may include 1 to about 30 separating sheets. The plurality of zones may include a circular center zone encased in a center circular separating sheet and a plurality of outer zones separated by separating sheets. The dynamic catalytic conversion reactor may comprise a heat transfer medium within the plurality of zones and between the plurality of tubes. The dynamic catalytic conversion reactor may include about 100 to about 50,000 tubes.

The dynamic catalytic conversion reactor may be configured to operate using hydrogen generated from a renewable energy source, configured such that each of the plurality of zones is separately operational, and/or configured to adjust operation based on the amount of hydrogen supplied by the renewable energy source. The dynamic catalytic conversion reactor may be configured to operate using hydrogen generated from a renewable source such as from biowaste or biomass gasification or pyrolysis.

A system for catalytic carbon conversion is also disclosed. The system comprises a dynamic catalytic conversion reactor; one or more plate heat exchangers coupled to the dynamic catalytic conversion reactor, and configured to receive a reactor effluent produced by the dynamic reactor; a separator coupled to the one or more heat exchangers; one or more compressors coupled to the separator; a carbon source gas; and renewable energy supply. The renewable energy supply may include a water electrolysis system, and optionally hydrogen generated by the water electrolysis system and the carbon source gas combine to form a feed gas for the dynamic catalytic conversion reactor. The system may include one or more compressors which comprise a plurality of compressors, optionally arranged in parallel, and optionally with one or more spillbacks coupled to each compressor. Each of the plate heat exchangers may be corrugated, and optionally the heat exchanger comprises: a process fluid; a cooling fluid; and a plurality of sections configured to be separately operational. The system for catalytic carbon conversion may further include a liquid storage system coupled to the separator and configured to receive a liquid product from the separator.

A method for catalytic carbon conversion is also disclosed. The method includes supplying a feed gas into one or more of the plurality of zones in a dynamic catalytic conversion reactor; contacting the feed gas and the catalyst within the plurality of tubes in the feed gas zone to cause a carbon conversion reaction; and producing a reactor effluent from the carbon conversion reaction.

FIGURES

FIGS. 1A and 1B show a top cross-sectional view of a dynamic catalytic conversion reactor including multiple zones separated by separating sheets, with each zone having numerous tubes therein.

FIGS. 2A, 2B, 2C, 2D, 2E, and 2F show cross-sectional views of dynamic catalytic conversion reactors having differing arrangements and numbers of zones separated by separating sheets.

FIG. 3A is a side view of an example of a dynamic catalytic conversion reactor with hot oil flow within the outer wall with baffles.

Figure 14:
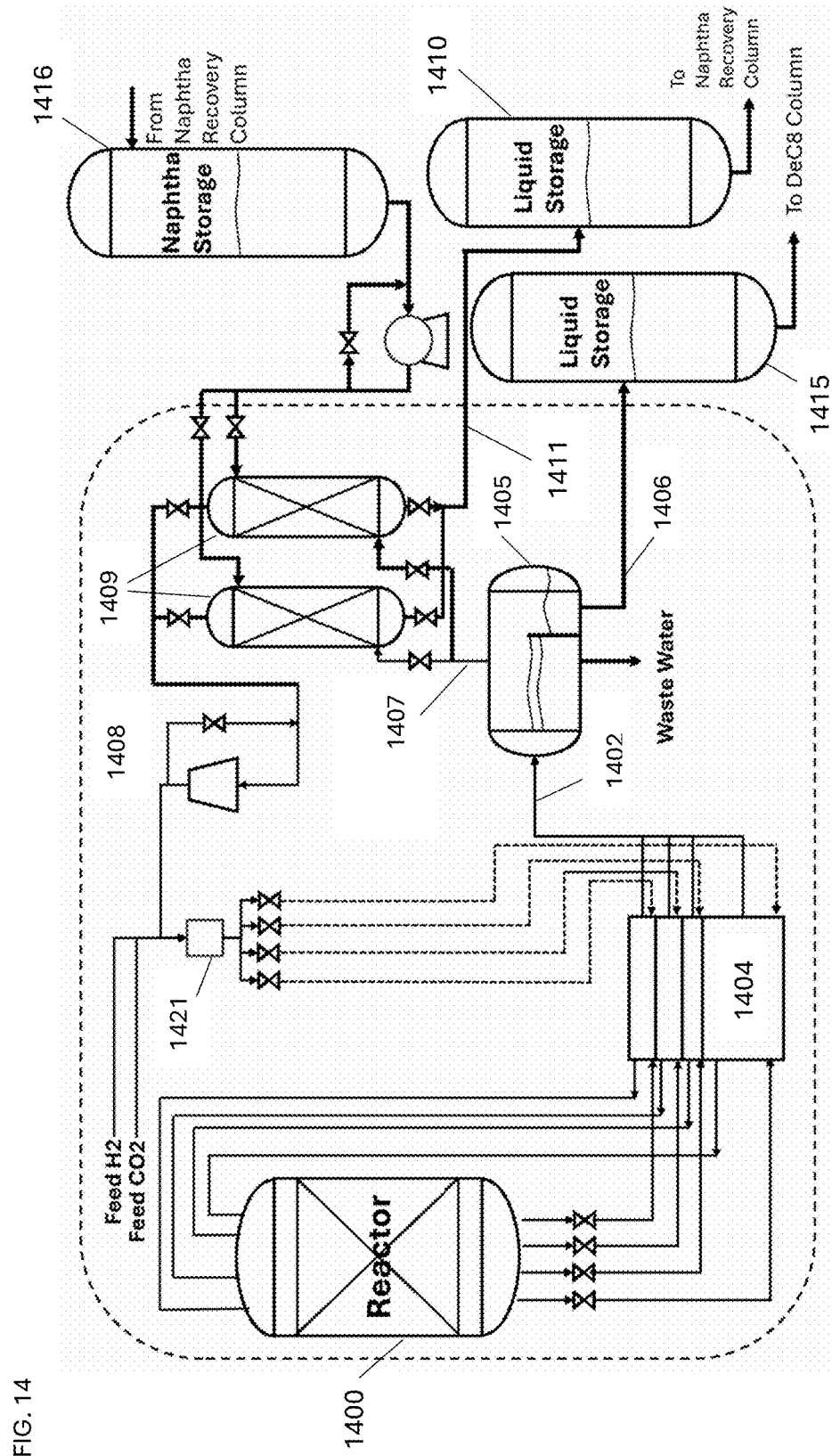

FIG. 14 an example of a system and process for $CO_2$ catalytic conversion using a dynamic thermal catalytic conversion reactor and other components that provides an effluent separated into gas and liquid streams, in combination with liquid and naphtha storage containers.

DETAILED DESCRIPTION

Disclosed herein is a dynamic catalytic conversion reactor that operates using renewable energy and is able to adjust its capacity based on the amount of energy introduced by a renewable energy source. The novel dynamic catalytic conversion reactor is able to adjust to the fluctuating hydrogen feed supply provided by the renewable energy source. In certain embodiments, the novel dynamic catalytic conversion reactor converts electrical energy into a liquid, whereby the liquid may be stored. In other embodiments, the novel dynamic catalytic conversion reactor converts electrical energy into a liquid and a gas, whereby the liquid and condensed gas may be stored. Thus, it solves a problem of challenges involved in the storage of electrical energy in that the novel dynamic catalytic conversion reactor utilizes a fluctuating energy source and converts to a liquid, and optionally gas, which can be easily stored as an energy source for later use, e.g., re-electrify or for cross sectorial use as in the transport sector. With the dynamic thermal catalytic conversion reactor, there is no need to incorporate energy storage to supply a consistent power supply to a water electrolysis system, though in certain embodiments, an energy storage system may optionally be included. The dynamic thermal catalytic reactor operates in a dynamic mode to adjust and apply the hydrogen supply from a water electrolysis system. In this way, renewable electricity directly from a renewable energy source, such as a solar farm, wind farm or windmills, can be utilized as direct current into the water electrolysis system and the hydrogen produced by the water electrolysis can be directly supplied to the dynamic catalytic conversion reactor disclosed herein. The dynamic reactor and the systems incorporating the dynamic reactor have an adjustable mode of operation to adapt to the unpredictable or fluctuating nature of renewable energy sources in terms of power generation. Hydrogen storage is not needed for such a dynamic operation, but optionally it may be partially incorporated into the system disclosed herein. The dynamic reactor and the systems incorporating the dynamic reactor may also operate using hydrogen from any source of hydrogen under steady state or dynamic condition.

The dynamic catalytic conversion reactor and system for chemical reactions, such as carbon conversion, or more specifically, $CO_2$ conversion, will have the following advantages, among others:

- Allow customers to use direct current from one or more renewable energy sources such as wind and/or solar energy, which will avoid or significantly reduce the need for energy storage.
- Allow customers to use hydrogen, and optionally also $CO_2$, CO, or a combination thereof, generated by renewable sources, such as from biowaste or biomass gasification or pyrolysis.
- Significantly reduce the cost of production from using renewable electricity. For example, at an electricity cost of ≤$0.015/kWh, the chemicals and fuels made from chemical reactions within the dynamic reactor using the system disclosed herein will be competitive with chemicals and fuels made from fossil fuels.
- When $CO_2$ hydrogenation is being performed using the dynamic system disclosed herein, the liquid product(s) coming from the system will be stored and the downstream units can be operated in a steady-state. Using a downstream, conventional liquid storage and control system, the dynamic $CO_2$ conversion systems disclosed herein will be combinable with downstream conventional, separation processes.

A dynamic catalytic conversion reactor for chemical reactions is disclosed comprising: an outer cylindrical wall having an inner portion filled with a plurality of tubes arranged in parallel to the longitudinal axis of the cylindrical wall. The body of the dynamic catalytic conversion reactor, which includes the outer cylindrical wall (reactor shell), may be made of any material and any size known in the art for use in catalytic reactors. The term "dynamic," as used herein, refers to equipment or system that is adjustable, tunable, and/or otherwise modifiable in its operation based on an input into the equipment or system.

The dynamic catalytic conversion reactor includes a plurality of tubes. Each of the plurality of tubes may have a top end and a bottom end. The top end of each of the plurality of tubes may be coupled to a top tube sheet and the bottom end of each of the plurality of tubes may be coupled to a bottom tube sheet. The plurality of tubes connected to the bottom tube sheet and the bottom tube sheet may be referred to as a tube bundle. The plurality of tubes may securely attached to the top tube sheet and to the bottom tube sheet. Each tube sheet may be a flat circular shape designed to extend the area within the outer wall of the dynamic reactor.

The inner portion of the dynamic reactor is divided into a plurality of zones separated by one or more separating sheets. Each separating sheet may be linear, circular, or constructed in any other shape suitable to divide the inner portion of the dynamic reactor into zones. The separating sheets may be the same shape (e.g., linear or circular) or different shapes (e.g., linear, circular, and/or other shape). When there is a plurality of separating sheets, each separating sheet may have a different shape or some may have the same shape, while other separating sheets have a different shape. The separating sheets may extend from the top tube sheet to the bottom tube sheet and are positioned to create a plurality of zones within the dynamic reactor. The separating sheets may securely attach to the top tube sheet and to the bottom tube sheet. One or more of the separating sheets may be connected to the outer wall of the dynamic catalytic conversion reactor. In some embodiments, the plurality of zones are the same size, and, optionally, the same shape. In other embodiments, some of the zones are the same size, and optionally the same shape, while other zones are a different size, and optionally a different shape. For example, each zone may be triangular with a rounded size, semicircular, circular, parallelogram with a rounded side, or other non-traditional shape. The zones may be configured to be different sizes to allow for the ability to control operation and dynamic functionality of the dynamic reactor. In certain embodiments, two of the zones are the same shape and size, while the remainder of the zones are a different size. The dynamic reactor may include any number of separating sheets. The dynamic reactor may include 1 to 20, 1 to 10, 2 to 10, 5 to 20, 10 to 20, 2 to 6, or 15 to 20 separating sheets.

In an embodiment, at the center of the inner portion of the dynamic reactor, or at the center of the tube bundle, is a circular center zone with a plurality of tubes arranged therein. In such an embodiment, the center circular separating sheet surrounds the circular center zone. In an embodiment, the dynamic reactor comprises linear separating sheets. The linear separating sheets may extend axially from a center point of the dynamic reactor or from the circular center zone of the dynamic reactor.

The separating sheets may be made from any material known for use in the art and may be configured top of the reactor and through the vessel body to ensure there is no or very low gas flow between zones. The thickness may vary depending on the size of the reactor, operating pressure, and/or the heat transfer medium. The separating sheets may have a thickness of about 1 mm to about 30 mm, about 1 mm to about 20 mm, about 1 mm to about 10 mm, or about 1 mm to about 3 mm. Importantly, each of the separating sheets is sealed at the top and bottom of the reactor so that there is no leakage or unwanted flow of materials between the zones. The zones may be sealed individually so that there is no flow (or low flow) between the zones within the reactor and no leakage. This ensures that the dynamic reactor can be operated at a high turndown ratio without significantly impacting product quality and yield. The turndown ratio is defined as the ratio of the difference between the maximum and actual flow of the feed gas through the dynamic reactor over the maximum flow of the feed gas through the dynamic reactor. At turndown operating conditions, the velocity and residence time of the feed gas through the tubes packed with catalyst are maintained within a certain range by adjustments determined by the number and/or size of the feed gas zones. The turndown ratio may be greater than about 70%, greater than about 80%, or greater than about 90%. The turndown ratio may be about 95%. For example, when a dynamic reactor has 21 zones with the same number of tubes in each zone, the turndown ratio may be about 95%.

The plurality of tubes is distributed between the zones. Each of the zones may have the same number of tubes therein or a different number of tubes. When present, the circular center zone may have a different number of tubes therein than the other zones. The dynamic reactor may have 2 to 31 zones, 7 to 31 zones, 15 to 21 zones, 2 to 12 zones, or 2 to 5 zones. The dynamic reactor may have 2, 3, 4, 5, 6, 7, 8, 9, or 17 zones.

The dynamic reactor may include about 100 to about 50,000 tubes distributed equally, substantially equally (e.g., about ±5%, or about ±1%), or unevenly between the zones. The dynamic reactor may include about 100 to about 50,000 tubes, with the tubes being distributed equally between the outer zones and with a different number of tubes arranged within the circular center zone. In an embodiment, the dynamic reactor includes about 100 to about 40,000, about 100 to about 20,000, about 100 to about 10,000, about 100 to about 5,000, about 500 to about 5,000, about 1,000 to about 10,000, or about 5,000 to about 10,000 tubes distributed between the zones.

The tubes may be made of any material and of any thickness known for use in the art for this purpose. The tubes may be made of ferritic steel. The tubes may have a wall thickness of about 1 mm to about 3 mm. The internal diameter of the tubes may be from about 20 mm to about 70 mm, or about 20 mm to about 35 mm. The length of the tubes will be the length of the body of the dynamic reactor. The dynamic reactor and/or the tubes may have a length of about 1.5 m to about 15 m. Each of the tubes may contain one or more catalysts. Any catalyst known for use in the art may be filled within the tubes. For example, the catalyst may be selected from the group consisting of any transition metal catalyst, and bimetallic catalyst (e.g., copper zinc for methanol, iron for paraffins, fuel, or Haber Bosch). The catalyst may be selected from the group consisting of catalysts for $CO_2$ hydrogenation to make methanol, catalysts for $CO_2$ hydrogenation to make ethanol, and catalysts for $CO_2$ hydrogenation to make synthetic fuels. The catalyst may be any one of the catalysts, or combination of catalysts, disclosed in U.S. Pat. Nos. 11,434,186, 11,293,107, U.S. Patent Publication Nos. 2023-0234037, 2023-0256423, 2023-0348347, and 2023-0390744, International Application Nos. PCT/US23/33544, PCT/US23/33547, and PCT/US23/76782, and, in commonly owned, U.S. patent application Ser. Nos. 18/934,440 and 18/934,821, both of which were filed on Nov. 1, 2024.

There may be a piping arrangement such that each zone of the dynamic reactor will have a feed pipe and a product pipe which connect to an inlet and an outlet, respectively, in the top and bottom, respectively, of the dynamic reactor. There may a first pipe at the top of each zone and a second pipe at the bottom of the zone, wherein the first pipe attaches to the top of the dynamic reactor and allows entry of the feed gas through an inlet and into the zone. When present, the second pipe attaches to the bottom of the dynamic reactor and allows exit of the reactor effluent through an outlet.

The dynamic thermal catalytic reactor may include a gas feed distributor at the top thereof an/or an effluent collector at the bottom thereof. The gas feed distributor may be configured to distribute the same or different gases to each of the zones. There may a plurality of separating sheets that is attached to the top tube sheet around each zone and a top cover plate to form a distribution box above each zone. A pipe for introducing gas into each of the distribution boxes may be attached to the top cover plate of each distribution box. The top cover plate and the attached gas introduction pipe may be removable for catalyst loading and reloading. In certain embodiments, there may be additional components, such as a horizontal sieve plate inside each of the distribution boxes for improving initial gas distribution. Momentum dampers, such as one or more sieve plates, may be added to the distribution boxes to improve initial gas distribution to each of the tubes.

The arrangement of the effluent collector may depend on whether the gases passing through the feed gas zone(s) and the idle zone(s) are the same/can be mixed or different/have to be separated. When the gases are the same or can be mixed, the effluent collector does not require one or more separating sheets around and between each zone. When the gases flowing between the feed gas zone(s) and the idle zone(s) cannot be mixed, the effluent collector comprises separating sheets configured to separate the effluent gas from each zone. The separating sheets may be attached to the bottom tube sheet and the bottom of the outer shell of the dynamic reactor and each of the zones will have an outlet pipe attached to the outer shell of the dynamic reactor through which the effluent gas is discharged. The dynamic reactor may include an outlet nozzle at the bottom of each zone for catalyst discharge. The area at the bottom of the dynamic reactor may also comprise a plurality of inert ceramic balls and/or screens near the outlet nozzles.

The dynamic reactor may be designed to minimize any pressure differential between the zones, and to maintain the pressure within any zone when it goes from a feed gas zone to an idle zone and vice versa. The dynamic reactor may operate at about 0 bar to about 200 bar, about 0 bar to about 120 bar, about 0 bar to about 100 bar, or about 0 bar to about 80 bar.

The dynamic thermal catalytic reactor may include a heat transfer medium flowing within the plurality of zones, and between the tubes. The heat transfer medium removes the reaction heat from the tubes. Any heat transfer medium known for use in the art may be used. The heat transfer medium may be steam, molten salt, hot oil, or a combination thereof. The heat transfer medium may be hot oil, which may provide improved stability for the dynamic thermal catalytic reactor. The heat transfer medium may supply heat to the idle zones and remove heat from the zones when operational ("feed gas zones"). All of the zones within the dynamic reactor may be kept "hot", which significantly reduces the re-startup time for the idle zones when they switch to feed gas zones.

A cooler and a heater may be included in the system disclosed herein downstream of the dynamic reactor. Multiple coolers and/or multiple heaters may also be incorporated. The cooler and heater are designed to cool or heat the heat transfer medium, as needed. If the dynamic reactor is operated at high turndown ratio, the heat of reaction may not be enough to overcome the heat loss of the system, and heat may be added to the heat transfer medium through the heater. If the reactor is operated at high throughput, the cooler may be used to remove the heat from the heat of reaction for exothermic reactions. By incorporating the cooler and heater, the system may be maintained at high temperatures that can initiate the chemical reaction, e.g., for methanol synthesis from $CO_2$. Any heater and cooler, as a single apparatus or a system thereof, known for use in the art may be used in the systems disclosed herein.

In order to effectively operate a dynamic thermal catalytic reactor with quick startup (of idle zones), the temperature of the reactor must be raised and maintained at an elevated temperature required to complete the reaction/conversion.

With conventional catalytic reactors, with a shift in operation modality, it would take a significant amount of time to raise the reactor temperature, which can be a disadvantage. The dynamic thermal catalytic reactor disclosed herein has solved this problem by maintaining the elevated temperature of the dynamic reactor, independent of the amount of hydrogen being supplied to the system at any point in time. The number of zones receiving the feed gas (e.g., hydrogen and the carbon source gas comprising $CO_2$) (herein also referred to as "feed gas zones"), adjusts depending on the renewable power being fed into the system. Regardless of the number of zones receiving the feed gas, the heat transfer media flows throughout all of the zones in the dynamic reactor. Regardless of the number of feed gas zones at any point in time, the tubes in all of the zones in the dynamic reactor are maintained at the same or substantially the same temperature in order for the chemical reactions to take place, and so that all of the zones within the dynamic reactor are at adequate temperature to receive feed gas without the need for pre-heating. As such, when there is an increase in the generation of hydrogen gas so that additional zones may be supplied with the feed gas, there is no need to pre-heat the dynamic reactor before initiating operation of additional zones. Idle zones may convert to feed gas zones in about 5 minutes to about 30 minutes, or about 10 minutes to about 30 minutes, thereby minimizing waste of the feed gas. For the zones that are not being supplied with feed gas ("idle zones"), a recycled reactor effluent gas, a bleed stream, CO, an inert gas (e.g., such as nitrogen, argon or helium), or a reducing agent may flow through these zones in order to preserve the catalyst activity. There may be a continuous flow of feed gas, recycled reactor effluent, inert gas, or reducing agent through all of the tubes in all of the zones of the dynamic reactor at all times. There may be a small amount of the feed gas, optionally referred to as a bleed stream, that flows through the idle zones to, in part, preserve catalyst activity. When the water electrolysis system can supply enough hydrogen to operate about half of the reactor zones or more, the idle zones may be supplied with a portion or all of the reactor effluent as a recycled reactor effluent from the feed gas zones. If the hydrogen supply is less than the amount to operate half of the zones, a reducing agent, such as CO, an inert gas, or a bleed stream may be supplied to the idle zones as an internal circulation. By maintaining a flow of one or more gases through the idle zones, the catalyst activity will be preserved, and the idle zones can be re-started quickly when hydrogen supply is increased.

The elevated temperature within the dynamic reactor may be maintained, independent of the amount of hydrogen being supplied to the system, by utilizing a portion of the liquid in the liquid storage system. When the dynamic reactor is used in connection with the production of sustainable aviation fuel, a portion of a secondary liquid product, such as LPG, naphtha or diesel, may be used to provide energy to maintain the temperature of the dynamic reactor. When the dynamic reactor is used in connection with the production of methanol, a portion of a purge gas, or portion of the liquid methanol product may be used to provide energy to maintain the temperature of the dynamic reactor. When the system is designed to utilize the purge gas to maintain the temperature of the dynamic reactor, a gas storage system may be added to the system disclosed herein and configured to store the purge gas until it is needed.

As explained above, the activity of the catalyst in the idle zones will be preserved by providing a continuous flow of a gas through the idle zones, preferably while maintaining a catalyst bed temperature and a reaction pressure within the idle zones. The continuous flow of gas may comprise a small amount of gas, for example, the bleed stream may be less than about 10% by volume, less than about 1% by volume, or less than about 0.1% by volume, of the feed gas being supplied to each of the feed gas zones. The catalyst bed temperature and reaction pressure are an ideal temperature and pressure for performing the desired chemical reaction within the dynamic reactor. The catalyst bed temperature and the temperature in the feed gas zone(s) may be the same or different depending on the operation of the dynamic reactor, which is readily understood by one of skill in the art. The reaction pressure in the feed gas zone(s) and in the idle zone(s) may be the same, or substantially the same (i.e., within about 100 psi, about 50 psi, or about 10 psi, or within about 5 psi). The gas flowing through the idle zones may be a bleed stream, recycled reactor effluent, a reducing agent, or other gas, e.g., CO, nitrogen, or hydrogen. The flow will be maintained for the time required by the low hydrogen feed supply time.

Preserving the catalyst activity means that the difference in yield of $CO_2$ conversion per pass through the reactor under the same operating conditions in a feed gas zone before and after operation as an idle zone will be less than about 0.5%, less than about 0.3%, or ≤about 0.1%.

When there is a maximum amount of hydrogen being supplied to the system disclosed herein, all the zones may be supplied with feed gas; that is, in this case, all of the zones in the reactor will be feed gas zones. When there is minimal hydrogen, a reduced number of the zones (e.g., one zone, two zones, three zones, etc.) may be supplied with the feed gas (i.e., feed gas zones), and the other zones will be supplied with a recycled gas effluent supplied by the feed gas zone, with a bleed stream, or with a reducing agent.

In another scenario, when no hydrogen is being generated for supply to the dynamic reactor disclosed herein, there are no feed gas zones and, in such a case, CO or other reducing agent may be supplied to the dynamic reactor. This CO, or other reducing agent, may be processed through all of the zones (in series or concurrently) of the dynamic reactor, and optionally recycled in a process flow loop. In another situation, a hydrogen buffer tank may be incorporated, and a small amount of hydrogen plus feed gas may be provided as a continuous flow through the idle zones to preserve catalyst activity. The amount of the feed gas in the bleed stream may be less than about 10% of the normal flow, less than 5% of the normal flow, less than about 1% of normal flow, or less than about 0.1% of normal flow. In this way, the hydrogen buffer tank may be very small to save on capital costs. This ensures that the stability and reactivity of the catalyst is preserved, and the system is ready without delay to become operational when hydrogen gas becomes available. For the reducing agent situation, there is little or no consumption of the reducing agent in this mode, the reducing agent will recycle from the product side to the feed side at the reactor standby status. The heat transfer medium will continuously pass through to maintain the reactor temperature. In this way, the dynamic reactor will maintain at reaction temperature and the catalyst will maintain the activity for fast re-start.

In an embodiment, when the amount of hydrogen being supplied to the system increases and causes a shift in operation, a valve positioned above the reactor will stop the flow of the reducing agent or inert gas between the zones and open a line to the feed gas. This allows modulation of the space gas velocity of the system by controlling the amount of reducing agent or inert gas entering the system.

In an embodiment, the dynamic thermal catalytic reactor operates and adjusts its process of operation based on the amount of hydrogen that is supplied into the $CO_2$ conversion system. In this embodiment, energy is supplied from a renewable energy supply (which may also be referred to herein as a renewable power source) into a water electrolysis system, which generates an amount of hydrogen gas based on the amount of DC energy that is supplied. Because the $CO_2$ conversion systems disclosed herein do not need to include energy storage, the amount of hydrogen generated from the renewable power source, or other renewable source, is the feed for the $CO_2$ conversion system. For example, when the renewable energy supply has the highest energy output, the water electrolysis system will supply the largest amount of hydrogen to the dynamic thermal catalytic reactor and all the zones within the dynamic reactor will be supplied with feed gas for $CO_2$ conversion. When the renewable energy supply produces only a small amount of electricity, the water electrolysis system will supply a small amount of hydrogen to the dynamic thermal catalytic reactor and fewer than all the zones of the dynamic reactor will be supplied with feed gas, and the remainder of the zones may be supplied with a recycled effluent gas generated by the passage and reaction of the feed gas or reducing agent through one or more zones. The dynamic reactor will consume electricity based on the gas flow rate; a lower gas flow rate will consume less electricity. For example, in a dynamic reactor that has 17 zones, any number of zones may be supplied with feed gas depending on the amount of hydrogen being supplied into the dynamic reactor, i.e., 1 zone, 2 zones, 3 zones, 4 zones, etc., all the way up to 17 zones and every number in between. Each zone is separately operational and sealed off from any flow to the other zones. In an embodiment, each of the plurality of zones is sealed to the dynamic reactor to prevent any leakage and any unintended flow of feed gas, CO, reducing agent, and recycle gas effluent, when present in the system.

The dynamic reactor may be designed such that there will be one feed gas zone when a minimum amount of hydrogen is generated, and all of the zones within the dynamic reactor will be feed gas zones when the maximum amount of hydrogen is generated by the water electrolysis system.

The dynamic reactor may be configured to operate using direct circuit from a renewable energy source and/or configured to adjust operation based on the amount of energy supplied by the renewable energy source. The dynamic catalytic conversion reactor may be configured to operate using hydrogen from water electrolysis.

The dynamic reactor disclosed herein may be heated using an electric heat source to further reduce $CO_2$ emissions. Conventional heating of reactors through fossil-fuel burning contributes to $CO_2$ emissions. Electrification of reactors, such as methods described in Wismann et al., "Electrified methane reforming: A compact approach to greener industrial hydrogen production," *Science* 364, 756-759 (2019) 24 May 2019, which is incorporated by reference herein in its entirety, may be used with the present disclosure. In an embodiment, this may incorporate a process of integrating an electrically heated catalytic structure into a steam-methane-reforming (SMR) reactor for hydrogen production. As explained in Wismann, "intimate contact between the electric heat source and the reaction site drives the reaction close to thermal equilibrium, increases catalyst utilization, and limits unwanted byproduct formation."

Also disclosed is a system for carbon conversion including the dynamic catalytic conversion reactor disclosed herein. The system may be a system for $CO_2$ conversion, CO conversion, or a combination thereof. The system may be a system for $CO_2$ conversion. The $CO_2$ may be converted into a hydrocarbon product mixture, optionally comprising a liquid product comprising $C_2$-$C_5$ hydrocarbons and a light hydrocarbon absorbed liquid product comprising $C_2$-$C_5$ hydrocarbons.

Certain components of these systems are described as being "coupled" to one another. As will be appreciated, the term "coupled" as used herein describes components that are operationally linked to one another, but does not preclude the presence of intervening components between those said to be coupled to one another. Additionally, as will be appreciated, various system components are described as "having" certain features. For example, in certain embodiments the dynamic reactor is described as having a first feed gas inlet, and a reactor effluent outlet. Such descriptions do not preclude, and specifically contemplate, the presence of additional features, such as inlets, outlets, valves, control mechanisms, measurement devices, heating and/or cooling systems, etc. Additionally, in the systems of the present disclosure, certain components are described as having one or more outlets or inlets. Such outlets and inlets may represent separate structural elements, or may be combined into a single inlet or outlet as suitable. The person of ordinary skill in the art will recognize that, once the critical features and operating conditions of systems such as those described herein are understood, the detailed design and operation of such systems involved many choices, such as specific reagent flows, separation steps, etc. While the present disclosure provides a number of specific embodiments, any suitable combination of these design choices may be made.

The system may include one dynamic reactor, a plurality of dynamic catalytic conversion reactors coupled together in parallel or in series, and/or one or more conventional catalytic reactors coupled to one or more dynamic reactors. Connecting dynamic catalytic conversion reactors may improve the modularity while improving the per pass conversion of the carbon source gas. Each of these multi-zone dynamic reactors can take up to a certain load variation rate. These multi-zone dynamic reactors may be used in combination in the production of methanol or hydrocarbon products, whereby the reactor effluent is separated and may be subjected to further processing to provide desired products. This approach may increase the single pass conversion and consequently reduce the amount of the circulating non-reacted gas, reduce compression load while having the same number of total tubes of a single stage conversion. The system for carbon conversion may include a water electrolysis system, one or more heat exchangers, one or more gas-liquid separators, and one or more compressors (or a compressor system, which may include a plurality of compressors with one or more spill back valves coupled to each compressor). When multiple compressors are included in the arrangement, they can also have different capacities thereby broadening the operational range of the system. One or more compressors having a high turndown ratio may be included, optionally wherein the turndown ratio may be greater than about 30%, greater than about 50%, or greater than about 70%.

The system for carbon conversion may comprise a carbon source gas, and a hydrogen source. The hydrogen source may be from a renewable energy supply, or it may be a steady state source. The carbon source gas may be syngas, $CO_2$, CO, biogas, other carbon-containing gas, or a combination thereof. The carbon source gas and the hydrogen source may be combined to make a feed gas. The system may be configured to supply the feed gas to the dynamic reactor via a feed gas inlet on the dynamic reactor.

The system for carbon conversion may include a control system for controlling valves, pressure, cooling and heating, and communication between the feed gas source(s), heating and cooling system(s), a pressure regulation system, compressors and spill back loop controllers. The goal of the control system is to balance activity to maximize yield and protect lifespan of the catalyst.

Figure 5:
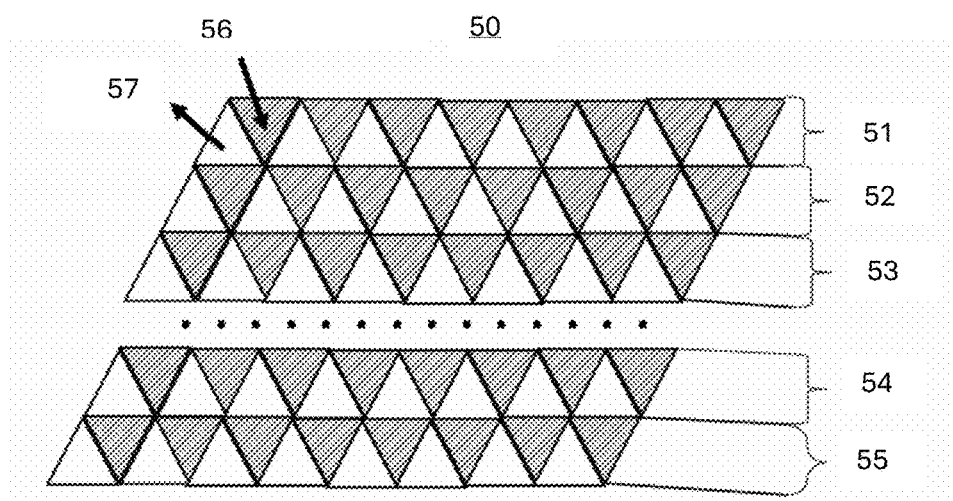
FIG. 5 is an example of a corrugated heat exchanger having many sections, which can be closed and opened based on the flow rate of the reactor effluent received from the dynamic thermal catalytic conversion reactor.

The heat exchanger may be coupled to the dynamic catalytic conversion reactor and configured to adjust to the flow rate of the reactor effluent. The heat exchanger may be a plate heat exchanger. A plate heat exchanger (e.g., a PACKINOX™) heat exchanger can be used since they can easily be divided into sections and zones. A corrugated type of heat exchanger separated into many sections may be used. The number of sections within the heat exchanger may be equal to the number of zones within the dynamic reactor. Each of the sections of the heat exchanger may be turned off or on to adjust to the operation and output from the dynamic reactor. FIG. 5 is an example of a corrugated heat exchanger 50 having many different sections 51, 52, 53, 54, 55, though it may have more sections or fewer sections, as will be readily envisioned by one of skill in the art. The reactor effluent 56 and cooling fluid 57 flow through the heat exchanger 50. The operation of the heat exchanger may be adjusted such that the number of sections in use matches the number of feed gas zones in the dynamic reactor that are producing the reactor effluent at any point in time. The different sections of the heat exchanger may be closed and opened based on the flow rate of the reactor effluent. The system may include a plurality of heat exchangers connected in parallel to the dynamic reactors. The plurality of heat exchangers may be two, three, four, five, six, seven, eight, or more heat exchangers connected in parallel to the dynamic reactors. The heat exchangers may be any conventional shell-tube heat exchangers when multiple heat exchangers are used.

One or more separators (high pressure or low pressure) may be incorporated downstream of the dynamic reactor to separate the gas and liquid in the reactor effluent. The separator may also separate water from hydrocarbons. Any separator known for use in the art in the separation of gas and liquid may be used in the systems and processes disclosed herein. The level of liquid within the separator may be controlled by controlling the liquid flow rate of the liquid leaving the separator. It may be desirable to maintain a constant level of liquid within the separator. The separator will be designed so that the gas-liquid dis-engagement time is sufficient for the highest reactor effluent flow when all the zones of dynamic reactor are in operation. For lower flow rate cases, the gas-liquid disengagement time will be sufficient.

Figure 6:
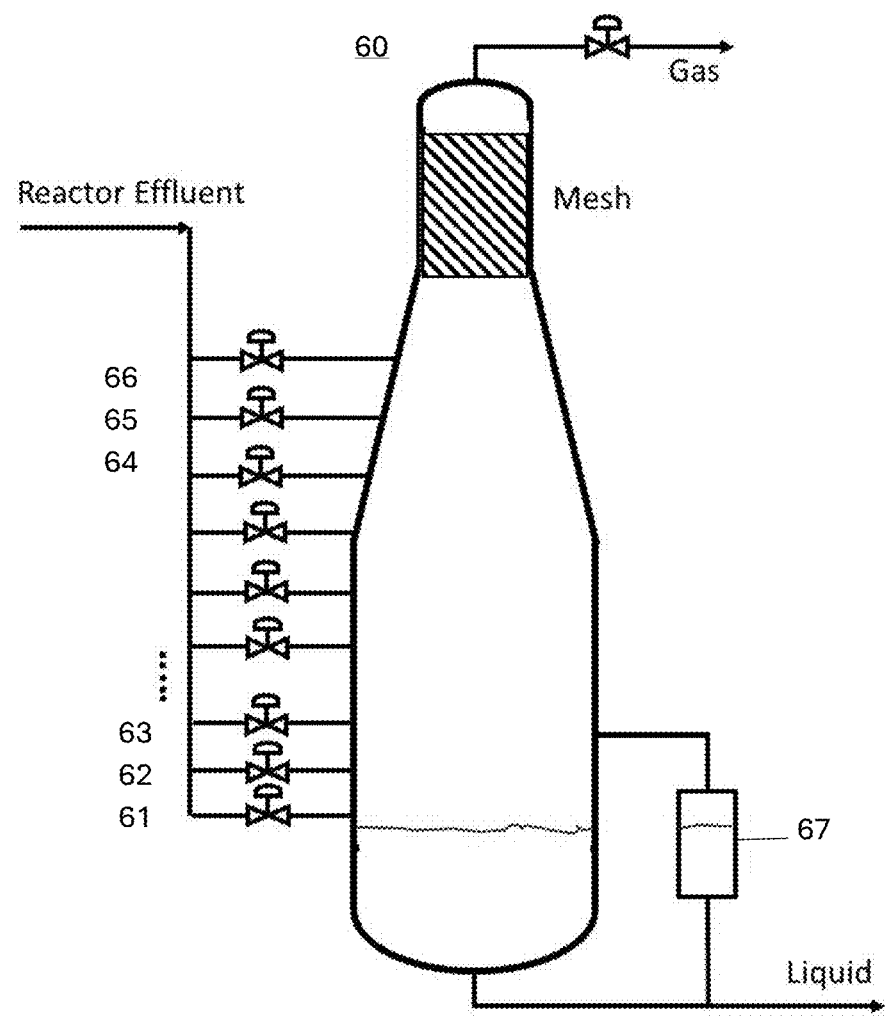
FIG. 6 is an example of a gas-liquid separator having multiple entrances for use with the dynamic thermal catalytic conversion reactor.

In one embodiment, a tall separator may be used, and the reactor effluent may be separated into a plurality of feed lines according to the flow rate with each feed line being coupled to the separator at a different level for point of entry (e.g., see FIG. 6). When the flow rate of the reactor effluent is at its maximum, the reactor effluent will be fed at the bottom (e.g., lowest level) of the separator, and when the flow rate is minimal, the reactor effluent will be fed to the highest level to achieve similar gas residence time between these situations. FIG. 6 is an example of a separator 60 designed to separate a reactor effluent stream into multiple feed lines 61, 62, 63, 64, 65, 66 based on flow rate, which may be used with the dynamic reactor disclosed herein. Feed line 66 represents the total number of feed lines (n), which may be 6-20, for example. In this example, line 61 is the entrance point for the reactor effluent at maximum capacity of the dynamic reactor. The vessel may be designed so that there is enough dis-engaging time (residence time) for gas and liquid at maximal flow rate. Line 66 is the highest entrance point for the reactor effluent entrance to the separator when the dynamic reactor is operated at minimal capacity. The distance from this point to the top of the column will be enough to dis-engage the gas and liquid when the flow is minimal. A level control 67 is shown in the example.

In other embodiments, there may be one feed line connected to the separator.

Figure 7:
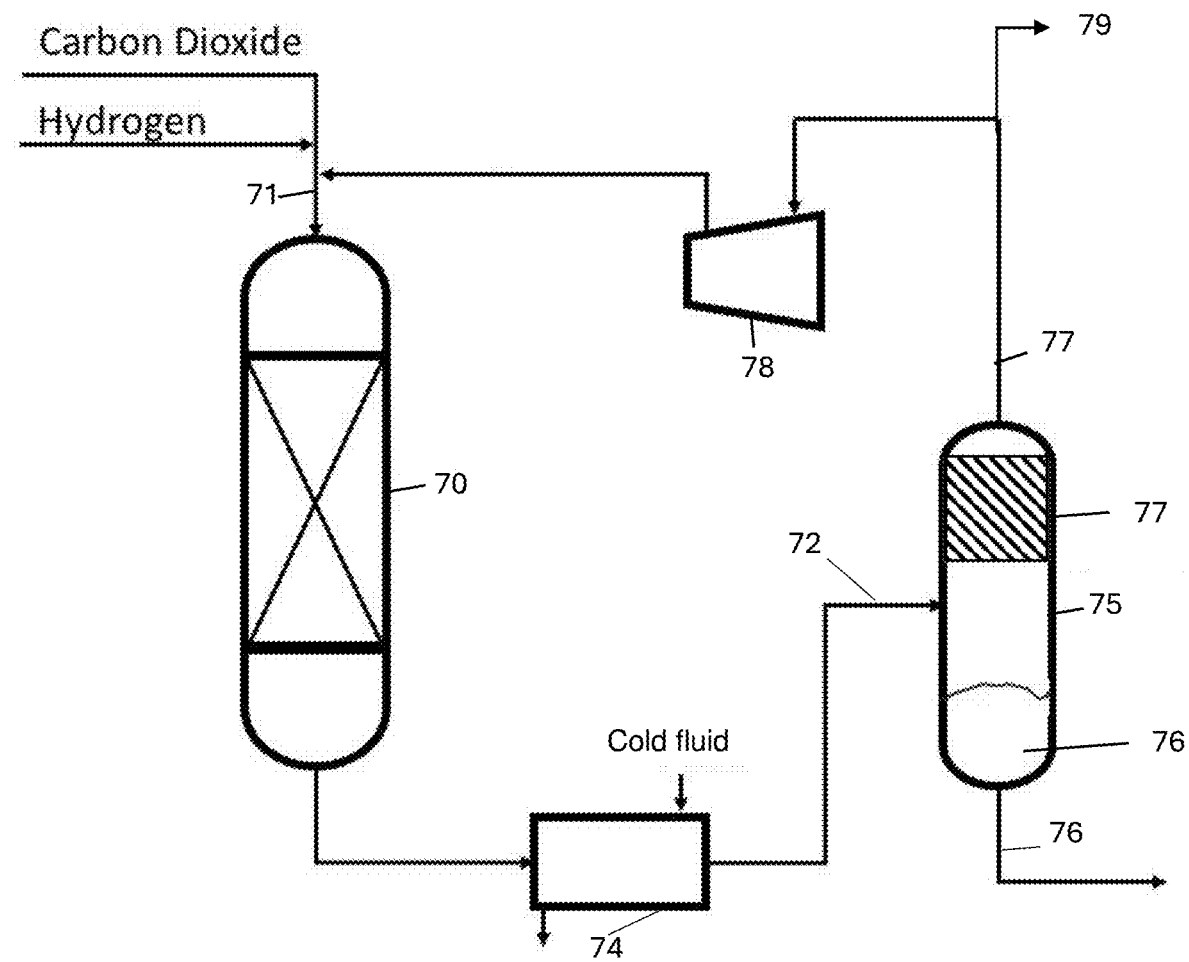
FIG. 7 is an example of a system and process for $CO_2$ catalytic conversion using a dynamic thermal catalytic conversion reactor.

FIG. 7 is an example of a system for $CO_2$ conversion using a dynamic reactor disclosed herein. As shown in this example, $CO_2$ and hydrogen combine to make a feed gas 71 which enters at the top of the dynamic reactor 70. The catalytic exothermic reaction within the dynamic reactor produces a reactor effluent 73 which passes through a heat exchanger 74 where the reactor effluent is cooled, and then the cooled reactor effluent 72 is directed to a separator 75. The reactor effluent remains within the separator for a residence time, which is the time required for adequate phase separation into a liquid product 76 and a recycle gas 77. The recycle gas 77 is directed to a compressor 78 and then combined with the feed gas 71. The recycle gas may comprise hydrogen, CO, $CO_2$, $CH_4$, or any combination thereof. A portion of the recycle gas may be released from the system as a purge gas 79.

Figure 8:
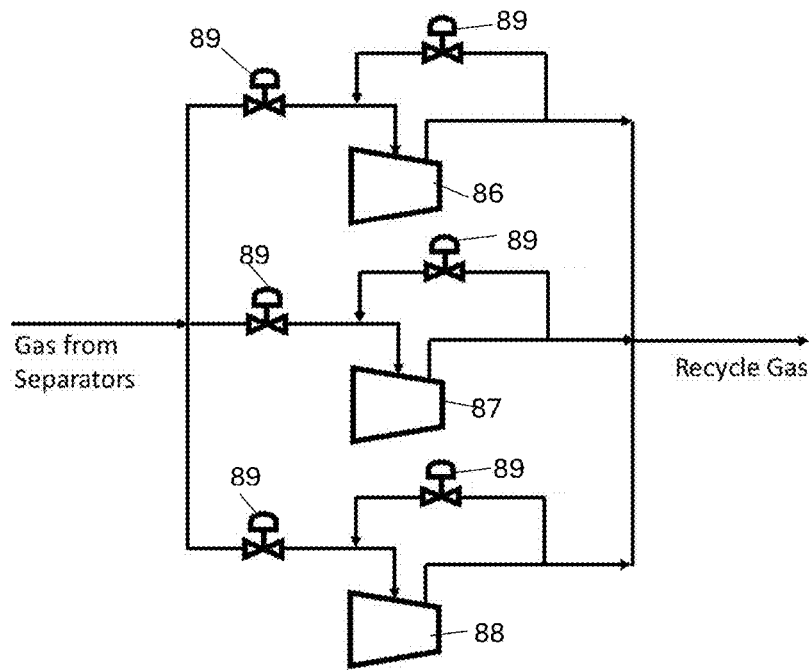
FIG. 8 is a schematic diagram showing parallel compressors with spill back.

It is readily understood by one of skill in the art that a system, such as that shown in FIG. 7, may include multiple heat exchangers, compressors, separators and/or valves, as may be needed, to operate the system effectively. For example, FIG. 8 is an alternate configuration which may be substituted in place of the single compressor shown in FIG. 7. Instead of a single compressor, FIG. 8 depicts three compressors 86, 87, 88 operating in parallel with each having multiple spillbacks 89 provided to control compressor capacity. It will be readily envisioned that the number of compressors and the number of spillbacks may be adjusted based on the need and design of each system to be effective in operation of the process. The number of compressors may be adjusted based on the turndown ratio. The compressor is included in the system to increase the pressure of the recycle gas to have it match the pressure of the feed gas.

In certain embodiments, the separator has a reactor effluent inlet, a water outlet, a liquid product outlet and a gas stream outlet. The gas stream outlet may be coupled to a gas inlet on one or more absorbers, and/or to a gas inlet on one or more compressors.

Because the operation of the components of the system is adjustable according to a fluctuating hydrogen supply, the size of the piping needed to accommodate gas flow must be considered. Parallel pipes may be required for different projects, and hydraulics will be designed for the piping to accommodate the flow rate from the maximum to the minimum.

The carbon source gas feed, e.g., $CO_2$, may be stored in the form of liquid(s), and withdrawn at different flow rates to meet the requirements of the dynamic catalytic conversion reactor disclosed herein.

The carbon conversion system disclosed herein may be coupled to a water electrolysis system for supply of hydrogen gas feed. Green hydrogen is made from water electrolysis using renewable electricity. Electrochemical processes have the natural advantage to operate in a dynamic mode for the following reasons:

1) Electrochemical processes are usually operated at room temperature, there is no need to raise the system temperature, which is time consuming.
2) The response rate of electrochemical processes is very fast.
3) The turndown ratio of water electrolysis is high; hence it can adjust the capacity of hydrogen production much easier and faster.
4) A large electrochemical process of water electrolysis is composed of many stacks for ease in adjusting the use. Some stacks, part of each stack, or a majority of the stacks, may be shut down or turned on, as needed, to respond to an increase/decrease in the renewable electricity supply.

The water electrolysis system disclosed herein may include multiple stacks for water electrolysis, with each stack generating hydrogen gas, which is supplied to the dynamic catalytic conversion reactor. The multiple stacks are used to scale up the green hydrogen production, which provides convenience for the operators running the system at different load and capacity, which is needed to operate a dynamic (i.e., changing and adapting) process.

The system and process for carbon conversion disclosed herein provides a steady output of a liquid product, e.g., hydrocarbons, alcohols, and/or oxygenates, based on design requirements, which are readily understood by those of ordinary skill in the art. The system and process for carbon conversion disclosed herein is configured to be adjustable to an unstable and fluctuating renewable energy supply (e.g., renewable electricity which powers water electrolysis to generate hydrogen) by providing a dynamic/adjustable mode of operation.

The system for carbon conversion may include a liquid storage system for capture and storage of the liquid product or liquid intermediates after exiting the separator. The liquid storage system may be positioned before distillation and/or downstream thermal catalytic processes and be used to transfer the liquid product of the dynamic system and process disclosed herein to a steady-state process, such as a thermal catalytic conversion of methanol to olefins (MTO), sustainable aviation fuel, diesel, LPG, or other hydrocarbon products. synthetic fuel production. As readily understood by those of skill in the art, different products may be produced by selecting and packing the dynamic reactor with the appropriate catalyst(s). The liquid storage system may be used to transfer the dynamic process operation mode to the steady-state operation mode. The liquid product or intermediate may be maintained at atmospheric pressure within the liquid storage system. As such, from distillation to the liquid storage system, there will be a reduction in pressure, and some $CO_2$ that is dissolved in the high-pressure liquid may be released. Any gas released may be compressed and fed back into the dynamic reactor. Because the flow rate is small, any conventional compressor with large spill back may be incorporated into the system to perform this function.

The liquid product in the liquid storage system may be crude methanol, or liquid hydrocarbon product comprising $C_{3+}$ hydrocarbons. When the dynamic reactor is used for SAF production, the liquid product in liquid storage may be a mixture of $C_{3+}$ hydrocarbons comprising paraffins, aromatics, alcohols, and olefins.

Operations after the liquid storage may be in steady-state mode. The amount of liquid product available for storage will fluctuate from a high level (i.e., when the renewable energy supply, e.g., renewable electricity, is at high output) and a low level (i.e., when the renewable electricity output is low, or there is no renewable energy supply). However, the liquid flow rate from the liquid storage system may be kept constant to guarantee the steady-state operation of any downstream steady-state systems. The term "steady-state," when used in this context, refers to a stable and constant supply, or constant, non-fluctuating operation.

The system for carbon conversion may include one or more absorbers coupled to the separator. The system may include one, two, three, or four absorbers. Each absorber may have a gas inlet, a condensed gas outlet, and a recycle gas outlet and may be configured to receive all or an optionally divided portion of the gas stream from the separator. An absorber or multiple absorbers connected in parallel or in series may be used to dissolve the condensable gas in the separated gas stream (e.g., $C_{2-5}$ hydrocarbons) to provide an absorbed liquid product, which then may be directed to and stored in a second liquid storage system. The absorbed liquid product may be a light hydrocarbon absorbed liquid product comprising $C_{2-5}$ hydrocarbons. The recycle gas outlet on each absorber may be coupled to one or more compressors configured to receive the recycle gas, which may subsequently be combined with the feed gas.

The absorber or plurality of absorbers may operate in a dynamic mode to adjust to the amount of throughput into the dynamic reactor, which determines the reactor effluent production at any point in time. For example, at low throughput, defined as operating up to a quarter of the total maximum flow rate to the reactor, one absorber can be in operation and the system may be configured so that the entire gas stream is provided to the one absorber, while the remaining one, two, or three absorbers may be in standby condition. When the throughput increases to a point at which a second absorber is needed to process the gas stream, (i.e., when the feed gas zones in the dynamic reactor increases, then the number of absorbers in use will increase) two absorbers can be in operation and the system may be configured so that the gas stream is divided to provide one part to a first absorber and a second part to a second absorber, while the remaining one, or two absorbers may be in standby condition. The same adjustment may be made to incorporate a third absorber, and then when a total of three absorbers are present in the system, all absorbers will be in operation. In the absorbers, condensable gas, such as $C_{2-5}$ hydrocarbons, will be absorbed by a liquid solvent. The undissolved gas may be separated out and sent to the one or more compressors for recycling. Any absorber known for use in the art may be used, such as a tray column, packed column, spray column, bubble column, wetted wall column, or plate column. Any suitable and selective liquid solvent known for use in absorbers and dissolving condensable hydrocarbons may be used, such as naphtha, diesel, other liquid suitable hydrocarbons.

In certain embodiments, the second liquid storage system may be coupled to a naphtha recovery column, which is a system in steady-state mode. The naphtha recovery column may be any apparatus or distillation column known for use in the art for stripping processes.

In an embodiment wherein the system includes two absorbers, the absorber may cover the range of 5-80% turndown of the hydrogen production by having two absorbers in swing operation. When two absorbers are present, they may be the same size or different sizes. In an embodiment, the system comprises a small absorber column and a large absorber column, optionally the small absorber column has a diameter about half the diameter of the large absorber column. When coupled to a naphtha storage system, by adjusting the naphtha flowrate from a naphtha storage system to the absorber, the liquid to gas ratio will change to operate in the regime of adequate separation of light gases and C3+ hydrocarbons.

TABLE 1

| Small Absorber, 5-20% | | Large Absorber, 20-80% | |
|---|---|---|---|
| N Stages | 10 | N Stages | 10 |
| Diameter (m) | 0.032 | Diameter (m) | 0.063 |
| Packed Height (m) | 6 | Packed Height (m) | 6 |
| Packing Size (mm) | 16 | Packing Size (mm) | 16 |
| L/G ratio | | L/G ratio | |
| 5% | 2.8 | 20% | 2.5 |
| 20% | 1.0 | 80% | 0.8 |

The table above shows how absorbers of two different sizes can be used with the systems of the disclosure and adjusted depending on hydrogen supply and related feed gas flow rate. As shown in Table 1, when the flow of feed gas to the dynamic reactor is about 5% to 20% of the maximum flow of the feed gas, the smaller absorber is used and maintains a L/G ratio between 1 and 2.8. The L/G ratio is the ratio of liquid solvent:gas in the absorber. It is determined by the sorbent (solvent) selectivity, thermodynamics, operating conditions and hydraulics. In general, a higher L/G ratio indicates better absorption but requires larger equipment and larger operating costs. Varying the L/G ratio can affect the amount and variability of compounds that are absorbed versus the ones that exit as gas. IN the systems disclosed herein, the L/G ratio can be held constant by adjusting the flow rate of the naphtha solvent from the naphtha storage system.

When the flow of feed gas to the dynamic reactor is about 20% to 80% of the maximum flow of the feed gas, the larger absorber is used and maintains a L/G ratio between 0.8 and 2.5. When the flow of feed gas to the dynamic reactor is greater than 80% of the maximum flow, both small and the large absorbers are used in parallel maintaining a L/G ratio close to desired operational range.

In still further embodiments, the naphtha recovery column may be coupled to a naphtha storage system configured to provide naphtha to the one or more absorbers.

When the second liquid storage system and the naphtha storage system are included in the system, it is a three-liquid tank system for storing three different liquids: the first liquid storage system is configured to store liquid hydrocarbons (e.g., $C_{5+}$) made from hydrogenation reactors; the second liquid storage system is configured to store the liquid dissolved with condensable gases (e.g., $C_{2-5}$); and the naphtha storage system is configured to store lean liquid provided by a steady-state naphtha recovery column to regenerate the liquid dissolved with condensable gases. The lean liquid refers to solvent, here, the naphtha, which has been purified, i.e., all or substantially all of the absorbed compounds or substance have been removed therefrom. All the downstream upgrades and separations will be operated at steady-state mode, and amount of liquid present in each liquid storage tank will fluctuate based on the liquid and gas products generated from the dynamic reactor.

When present, a naphtha recovery column is used to strip out the absorbed condensable gases (e.g., $C_2$-$C_5$) from the impure naphtha mixture, referred to as "rich naphtha." The naphtha recovery column may include a rich naphtha feed inlet wherein the rich naphtha comprises naphtha, absorbed condensable gases, and two product streams. In the naphtha recovery column, the rich naphtha is separated with the absorbed condensable gases leaving the top of the column, and the naphtha (which may also be referred to as a lean solvent) exiting from the bottom of the column. The naphtha may then be directed to a naphtha storage tank to be reused in processing of the absorbers.

It is a significant advantage of the dynamic systems and processes disclosed herein that, while carbon conversion (e.g., hydrogenation) is run as a dynamic operation, the products coming from the system and process will be in a steady state. Using the liquid storage system and, optionally, a control system for level control, the dynamic systems and processes disclosed herein may be combined with a downstream steady-state thermal catalytic process or other steady-state processes to make different products.

The systems and processes disclosed herein may also be used for chemical reactions, such as ammonia synthesis prepared by the Haber Bosch process or similar processes. For ammonia synthesis, the feed gas comprises nitrogen gas combined with hydrogen gas generated by the renewable energy source. The catalyst may be iron, ruthenium, or other catalyst known for use in ammonia synthesis.

Also disclosed herein is a method for a chemical reaction and a method for catalytic $CO_2$ conversion. The method includes supplying a feed gas into one or more of the plurality of zones in the dynamic catalytic conversion reactor. Catalytic $CO_2$ conversion may be $CO_2$ hydrogenation. All of the terms used in connection with this embodiment have the same meaning as defined with respect to the other embodiments discussed above.

The method may include supplying a feed gas into all of the zones in the dynamic catalytic conversion reactor. The method may include supplying a feed gas to a portion of the zones in the dynamic catalytic conversion reactor, those zones being referred to as feed gas zones. The feed gas may comprise a carbon source gas and hydrogen gas. The hydrogen gas may be generated by a water electrolysis system supplied with a renewable energy supply. The hydrogen gas may be generated by biowaste or biomass gasification or pyrolysis.

The method may include maintaining a reaction temperature within the dynamic reactor by providing a steady flow of a heat transfer medium within all of the zones and between all of the tubes. The method may include preserving the activity of the catalyst by providing a flow of a bleed stream, recycled reactor effluent, reducing agent or inert gas through the catalyst whether in an idle zone or a feed gas zone.

The method may comprise contacting the feed gas with the catalyst within the tubes in the feed gas zone to cause a chemical reaction. The method may comprise contacting the feed gas with the catalyst within the tubes in the feed gas zone to cause a $CO_2$ conversion reaction. The chemical reaction may produce a reactor effluent, which may optionally be directed to a heat exchanger for cooling. The number of sections of the heat exchanger in operation changes based on the amount of hydrogen gas supplied to the dynamic catalytic conversion reactor.

The method may comprise directing the reactor effluent to a separator after processing in a heat exchanger. In certain embodiments, the method includes separating the reactor effluent into a liquid product, and a recycle gas. The recycle gas may be directed to one or more compressors and then combined with the feed gas for recycling into the dynamic reactor. In certain embodiments, the method includes separating the reactor effluent into a liquid product, a gas stream, and water.

The method adjusts based on the amount of hydrogen gas supplied to the dynamic reactor. When an amount of hydrogen gas supplied to the reactor fluctuates, a total number of feed gas zones may change based on the amount of hydrogen gas supplied to the dynamic catalytic conversion reactor. In this way, the method may comprise supplying CO, or a reducing agent to one or more of the plurality of zones in the dynamic catalytic conversion reactor. When no hydrogen gas is being generated by the water electrolysis system, the method may comprise supplying CO, or a reducing agent to all of the zones in the dynamic catalytic conversion reactor. When the hydrogen gas being generated is equal or above 50% of the capacity, the method may comprise combining the reactor effluent with feed gas to the zones that are not supplied with feed gas.

The method may comprise processing the gas stream through one or more absorbers to provide a recycle gas and a light hydrocarbon absorbed liquid product. The light hydrocarbon absorbed liquid product may be stored for use in a further downstream steady-state process, for example, after distillate recovery, in a naphtha recovery column.

Another method is directed to making methanol comprising supplying a feed gas into one or more of the plurality of zones in the dynamic catalytic conversion reactor, wherein the feed gas comprises a carbon source gas comprising $CO_2$, and hydrogen gas; contacting the feed gas and the catalyst in the feed gas zones to cause a $CO_2$ conversion reaction; producing a reactor effluent from the $CO_2$ conversion reaction; separating the reactor effluent into a liquid product, a gas stream and water; directing the liquid product to a liquid storage system; and processing the stored liquid product in a methanol purification process to make methanol. Any known system for methanol purification to provide methanol may be used in accordance with the method and systems herein. The methanol purification process may include processing the liquid product through a stripping column.

Another method is directed to preserving catalyst activity in the dynamic reactor by providing a continuous flow of one or more gases through one or more of the plurality of zones that are not supplied with the feed gas. Preserving catalyst activity may include supplying CO, recycled reactor effluent, a bleed stream or other reducing agent or gas to one or more of the idle zones of the dynamic reactor.

Figure 1A:
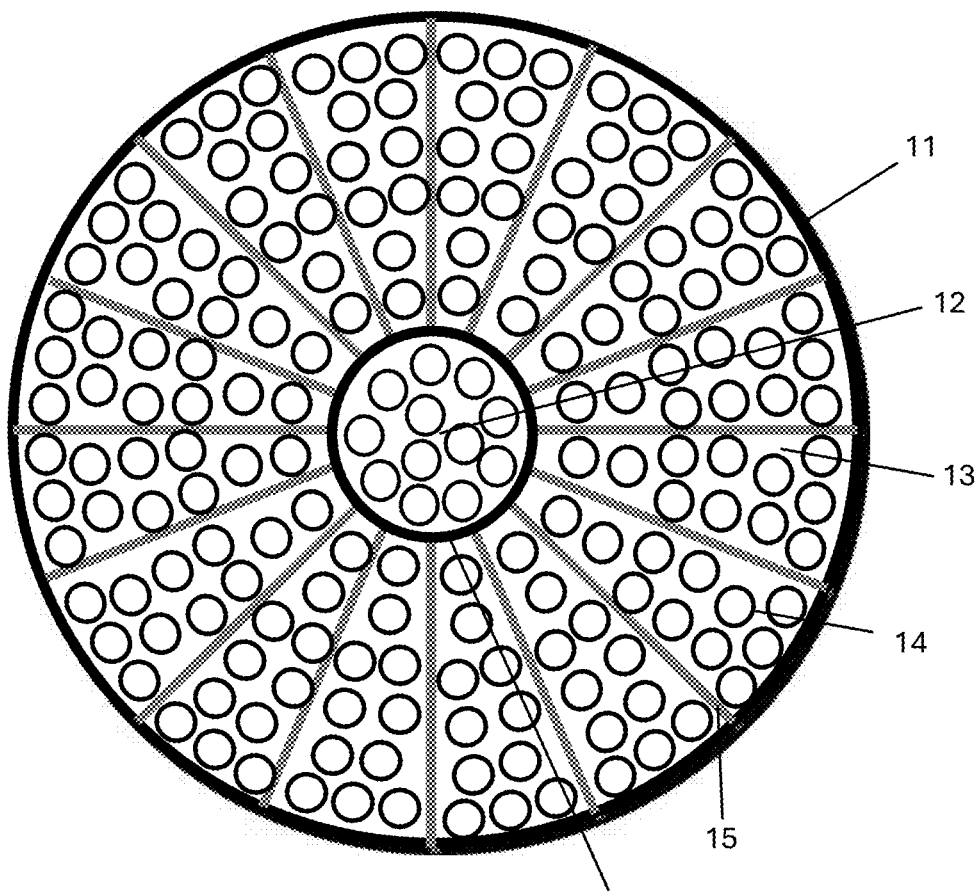
Figure 1B:
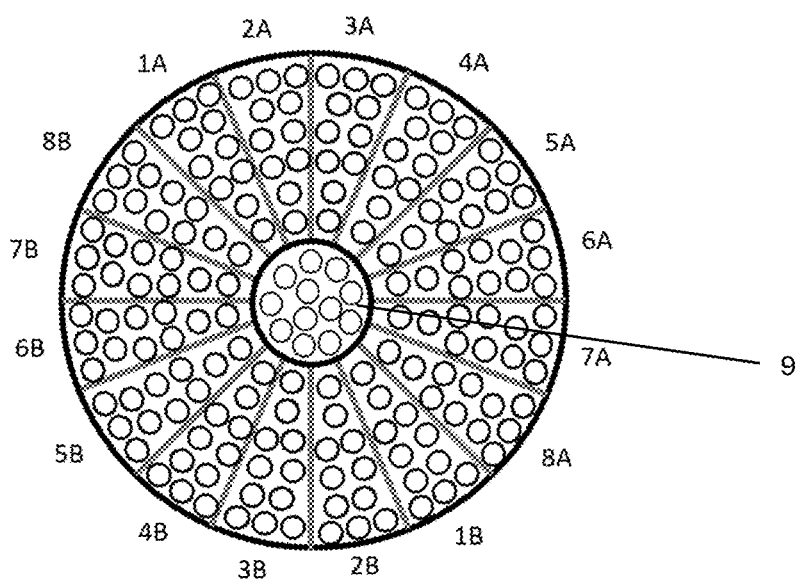

The disclosure will be further explained by referring to certain non-limiting examples of embodiments. FIGS. 1A and 1B are examples of a cross-section of a dynamic thermal catalytic reactor disclosed herein. The dynamic reactor 10 includes seventeen zones (1A, 1B, 2A, 2B, 3A, 3B, 4A, 4B, 5A, 5B, 6A, 6B, 7A, 7B, 8A, 8B, and 9) separated by linear separating sheets 15, and housed with the outer cylindrical wall 11. The circular center zone 12 is surrounded by a center circular separating sheet 16 and contains twelve tubes 14 therein, while the exterior zones 1A, 1B, 2A, 2B, 3A, 3B, 4A, 4B, 5A, 5B, 6A, 6B, 7A, 7B, 8A, 8B have eleven tubes 14 therein. A heat transfer medium 13 flows between the tubes 14.

Figure 2A:
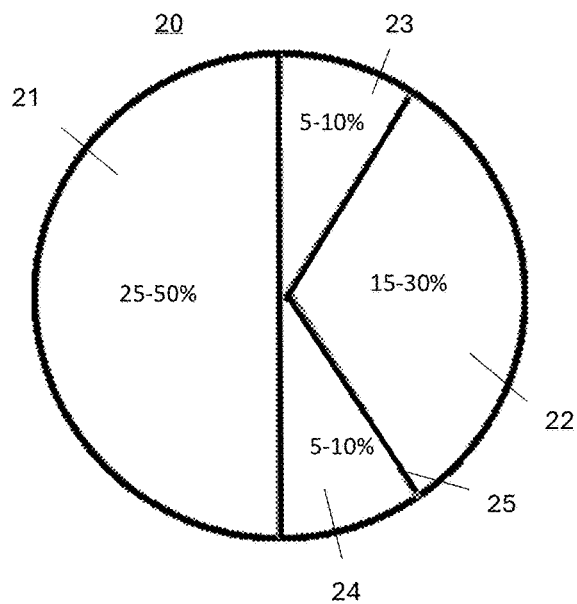
Figure 2B:
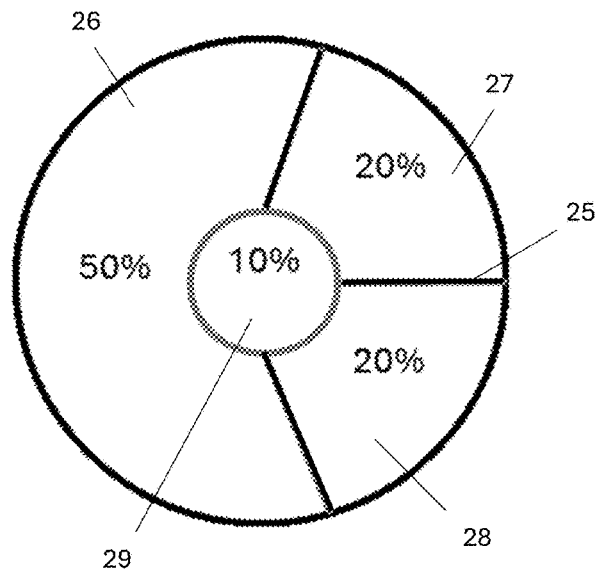
Figure 2C:
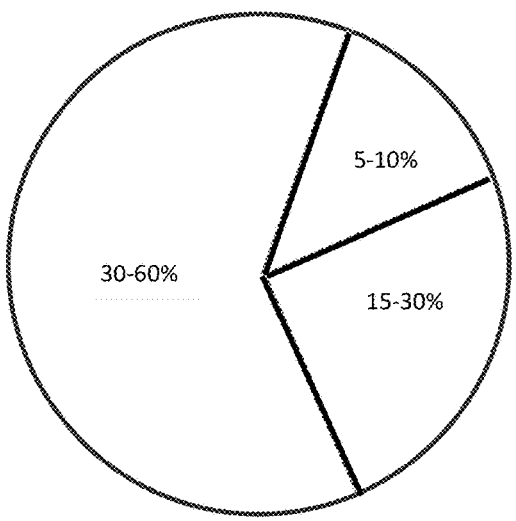
Figure 2D:
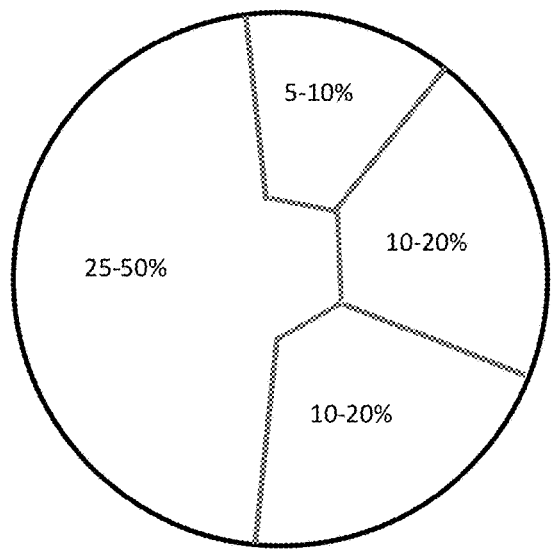
Figure 2E:
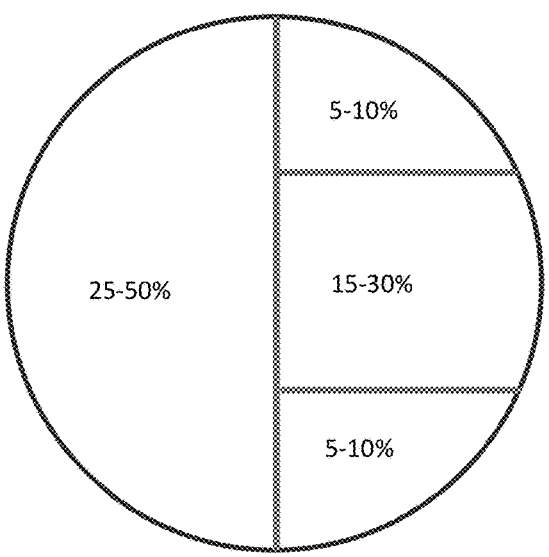
Figure 2F:
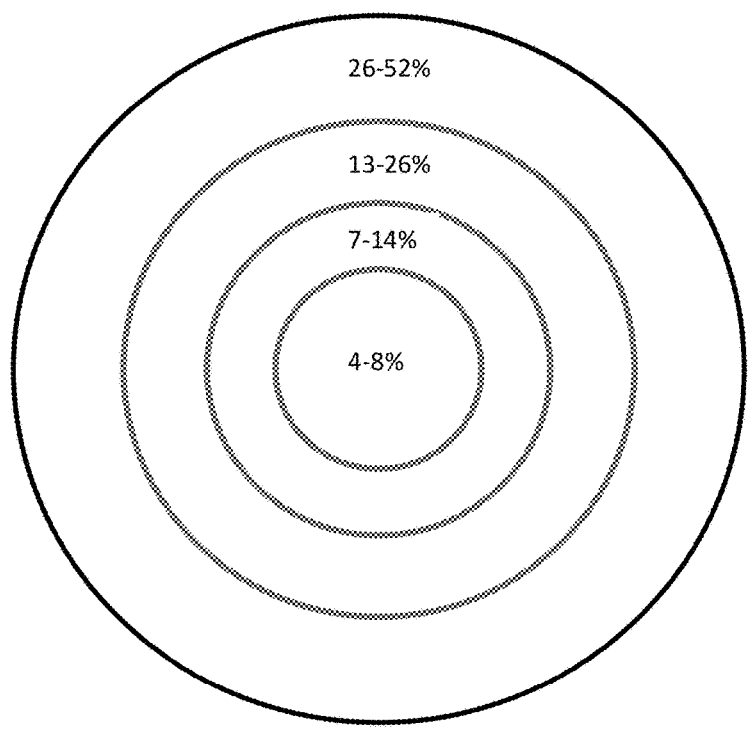

FIGS. 2A and 2B are also examples of dynamic thermal catalytic reactors disclosed herein having four zones of three different sizes. The dynamic thermal catalytic reactor of FIG. 2A does not include a center circular separating sheet or a circular center zone and has four zones with separating sheets extending radially from a center point of the reactor. Either of these four-zone reactors is able to achieve 10% to 100% operating capacity for the dynamic reactor. For the 10% zone 23, 24, 29, a zone within the dynamic reactor may be operational with 5% of the gas flow by lowering the space velocity to 50%. This may also be understood by explaining that if the space velocity of the gas in each of the feed gas zones can be lowered (e.g., to 50% of normal flow) without significantly impacting the product quality and yield, the turndown capability can be further increased (e.g., down to 5% of maximum design flow from 10% as shown in the figure). Once the space velocity is reduced as such, the dynamic reactor can achieve 95% of turndown ratio. Accordingly, each of the zones has an operational range within the bounds of the GHSV. FIG. 2D shows the percentage of max flow of feed gas in each zone. The operational range of feed gas flow in each zone is included in FIGS. 2A, 2C, 2D, 2E. and 2F. FIG. 2A may be operated under the following operations depending on the amount of hydrogen supplied into the reactor: 100% capacity will operate four zones; 90% with zones 21, 22, 23; 80% with zones 21 and 22; 70% with zones 21, 23, 24; 60% with zones 21 and 23 or 24; 50% with zone 21; 40% with zones 22 and 23 or 24; 30% with zone 22; 20% with zones 23 and 24; 0% with zone 23 or 24. For FIG. 2A, the percentage of max flow in each of the zones 21, 22, 23, 24 is 50%, 30%, 10%, and 10%, respectively. FIG. 2B may be operated under the following different operations depending on the amount of hydrogen supplied into the reactor: 100% capacity will operate with all four zones; 90% with zones 26, 27, 28; 80% with zones 26, 27, 29; 70% with zones 26 and 27 or 28; 60% with zones 26 and 29; 50% with zone 26; 40% with zones 27 and 28; 30% with zones 27 or 28 and 29; 20% with zone 27 or 28; 10% with zone 29. Again, if the space velocity of the reactants in each of the feed gas zones can be lowered (e.g., to 50% of normal flow) without significantly impacting the product quality and yield, the turndown capability can be further increased (e.g., down to 5% of maximum design flow from 10% as shown in the figure) and the incremental changes of the feed gas flows into the dynamic reactor can be in 5% (e.g. 100%, 95%, 90%, 85%, etc.)

Looking at FIG. 2A, this design operates in a dynamic mode to adjust the extent of gas flow in each zone within the ranges shown assuming the gas space velocity in each zone can be lowered to 50% of the design values without negative impact on reaction selectivity and yield.

A dynamic reactor may be divided into four zones of differing sizes, such that the maximum flow through each of the zones is 7%, 10%, 24% and 59% of the overall maximum feed gas rate. With the space velocity being turned down to about 70% of the maximum flow in each zone, each of the 4 zones can be operated with a minimum flow of about 5%, 7%, 17% and 41% of overall feed gas flows into the dynamic reactor. With this segmentation of the dynamic reactor, the operating range of each of the 4 zones is 5-7%, 7-10%, 17-24%, and 41-59% of overall maximum feed gas flow. By the combination of one or more of the 4 zones, the dynamic reactor can be operated with any gas flows from 100% to 5% (20:1) of the overall maximum feed gas flow while the actual gas hourly space velocity in each of the zones changes from 100% to about 70% (~1.4:1). With the controlled gas space velocity within a narrow range through the feed gas zones, the product quality and yield are maintained as designed.

Table 2 shows an example of adjusting the flow to different zones based on the hydrogen input and the GHSV. As such, Table 2 includes data on normalized gas hourly space velocity (GHSV), otherwise referred to herein as "space velocity," which is defined as the volumetric flow rate of gas at reactor inlet and standard conditions divided by the volume of catalyst in the reactor. The space velocity is unique to each catalyst and dictates the operational zone to maximize catalyst productivity, selectivity, stability, and lifetime. Another benefit of the dynamic reactor disclosed herein is that the control over the selection of feed gas zones and idle zones may further be adjusted to maintain a space velocity as close to 100% as possible. Space velocity may be used as another parameter by which to adjust the dynamic reactor to achieve superior operation and design parameters, e.g., lifespan of the catalyst, and turndown. In particular, Table 2 represents a dynamic reactor having 4 zones, wherein the zones operate at 7%, 10%, 24%, and 59%, respectively, of the maximum feed gas flow. In the inventive system disclosed herein, it may be desirable to counteract the fluctuating feed with a relatively stable condition by: 1) having different zones to direct partial loads to smaller number or tubes, while maintaining temperature, pressure and GHSV in a narrow range (non-equally distributed tube segments allowing high load variation within narrow GHSV range); 2) GHSV suitable range definition is not a direct control parameter but identifying this range provides another degree of freedom under dynamic conditions.

TABLE 2

| Flow range | Zones | | | | GHSV [normalized] |
|---|---|---|---|---|---|
| | I | II | III | IV | |
| 5% | x | | | | 66.5% |
| 10% | | x | | | 99.8% |
| 15% | x | x | | | 87.4% |
| 20% | | | x | | 83.0% |
| 25% | | | x | | 103.8% |
| 30% | | x | x | | 84.6% |
| 35% | | x | x | | 102.0% |
| 40% | x | x | x | | 96.4% |
| 45% | | | | x | 73.5% |
| 50% | | | | x | 82.4% |
| 55% | | | | x | 92.5% |
| 60% | | | | x | 104.2% |
| 65% | | | x | x | 75.5% |
| 70% | | x | | x | 81.8% |
| 75% | | x | | x | 87.6% |
| 80% | | | x | x | 95.9% |
| 85% | x | | x | x | 94.5% |
| 90% | x | | x | x | 103.7% |
| 95% | x | x | x | x | 94.9% |
| 100% | x | x | x | x | 100.0% |

FIGS. 2C, 2D, 2E, and 2F show other possible configuration for multi-zone dynamic reactors. The percent ranges shown in the different zones represent the fraction of the maximum feed gas flow to each varying modifications to the operational capacity of the zones. For example, when available feed gas flow is only 6% of the maximum feed gas flow, the feed gas will be directed to the zone labeled as 5-10% in FIGS. 2C, 2D, and 2E and the zone labeled 4-8% in FIG. 2F for reaction while other zones are idle zones.

To determine the number of tubes in different sized zones, a formula may be applied wherein the number of tubes in a larger zone is the total number of tubes in the smaller zone(s) divided by a ratio of (the minimum space velocity over maximum space velocity through the zone). For example, by applying this formula to a 4-zone dynamic reactor, and assuming that the minimum available total feed is 5% and the minimum gas space velocity is 70% of the design value at which there is no significant impact on product selectivity and yield (which is the "desired ratio" and is determined by lab experiments), the number of tubes in the smallest zone is 5%/70% (=~7%) of the total number of tubes in all zones. The next zone will contain 7%/70% (=~10%) of the total number of tubes in all zones. The third zone will contain (7%+10%)/70% (=~24%) of the total number of tubes in all zones. The fourth zone will contain (7%+10%+24%)/70% (=~59%) of the total number of tubes in all zones. The sum of tubes in all 4 zones is 100% (7%+10%+24%+59%).

For the same minimum available total feed being 5% of the maximum flow, the number of gas feed zones may be reduced to 3, if, for example, it is determined that the minimum space velocity in the gas feed zone(s) is 48% (as compared to 70% in the preceding example) of the design value without significantly impacting reaction selectivity and yield. Two zones may be needed if the minimum space velocity can be lowered to 25%. In such a case, the smaller zone may operate with 5-20% of the maximum overall flow available.

Figure 3B:
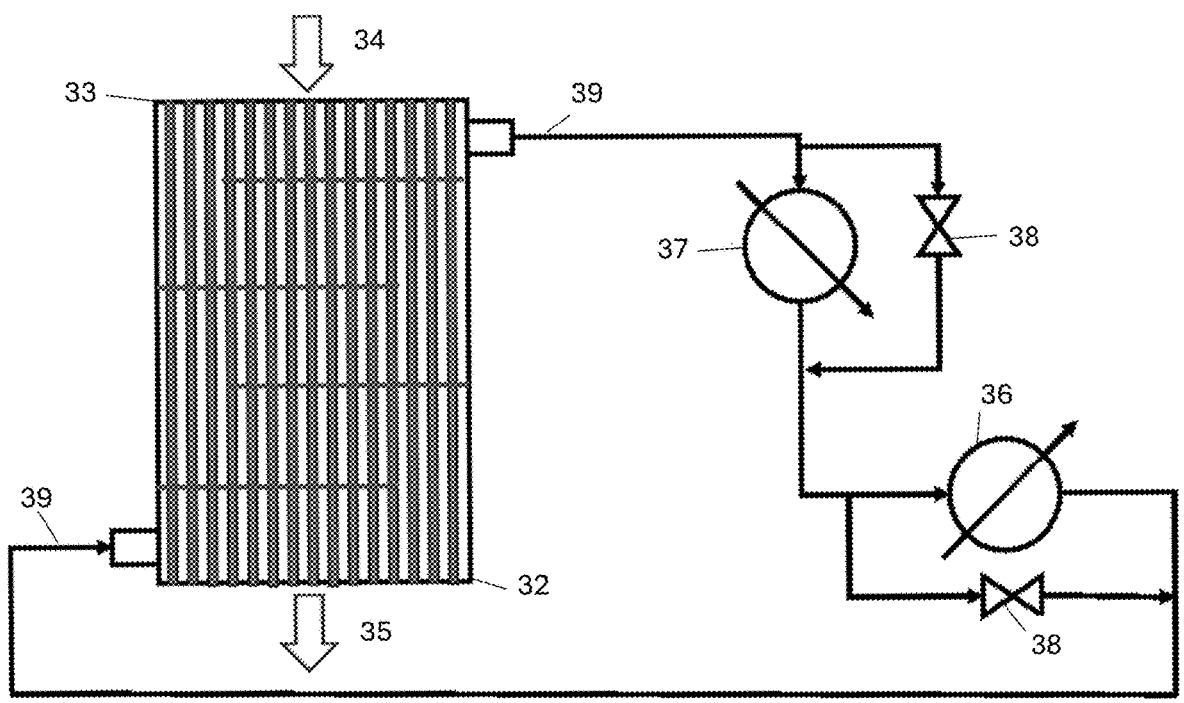
FIG. 3B is a schematic diagram showing the dynamic catalytic conversion reactor of FIG. 3A in a process configuration for heating and cooling of the heat transfer medium.

FIG. 3A is a side view of an example of a dynamic catalytic conversion reactor with baffles 31. In this example, hot oil is used as the heat transfer medium and is supplied at the bottom 32 of the reactor and exits at the top 33. In this example, a feed gas 34 is supplied to the top 33 of the reactor and flows through all of the zones (not shown). A reactor effluent 35 is produced and exits the bottom 32 of the reactor. FIG. 3B includes the dynamic catalytic conversion reactor of FIG. 3A with further detail on the flow and processing of the heat transfer medium 39. As shown, after exiting the dynamic catalytic conversion reactor, the heat transfer medium 39, or a portion thereof is cooled and heated before reentry into the bottom 32 of the reactor. Upon initiating the process and when hydrogen supply is low, the heat transfer medium needs to be heated by a heater 36 before reentry to maintain the temperature of all of the tubes in all of the zones. When hydrogen supply is high, the exothermic heat removed from the tubes is captured by the heat transfer medium and then removed in processing of the heat transfer medium through a cooler 37 as shown in FIG. 3B. The system may also include valves 38.

Figure 4:
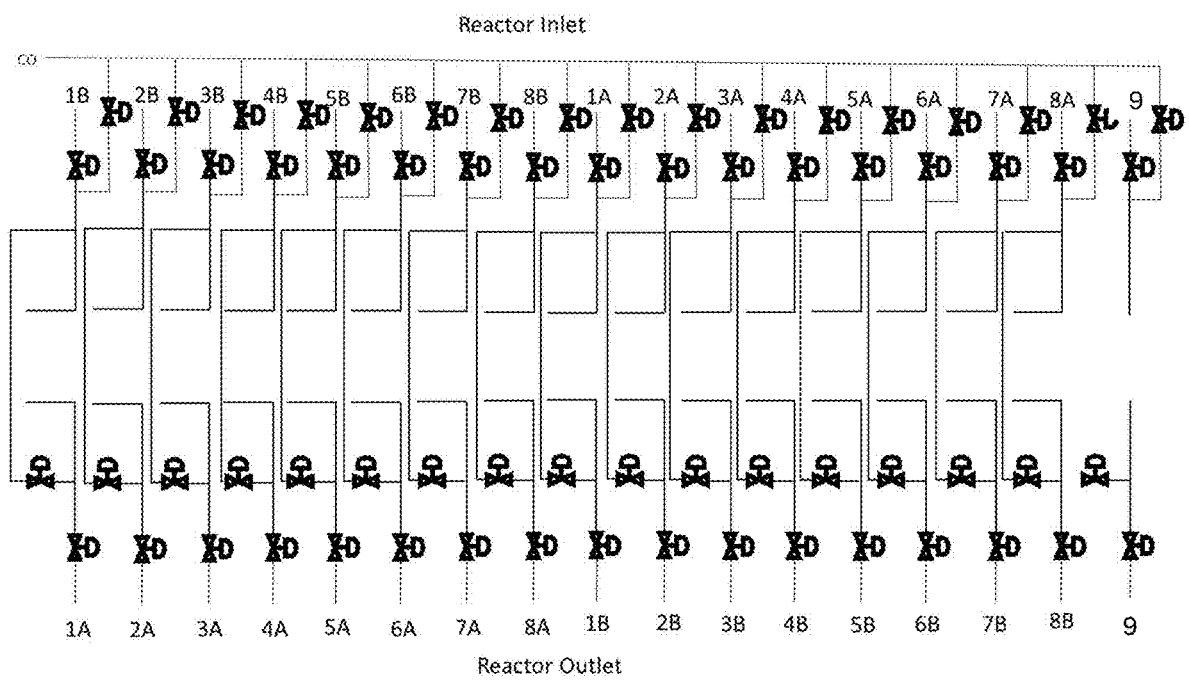
FIG. 4 is a schematic diagram showing the flow of gas through the zones of the dynamic catalytic conversion reactor of FIG. 1B.

FIG. 4 is an example of the flow of gas through the zones of the dynamic reactor in FIG. 1B when there is a minimal amount of hydrogen supply. When the water electrolysis system produces enough hydrogen to operate 50% or more reactor zones, some of the reactor effluent streams may recycle back to the feed side (i.e., top) of the zones which may be idle. For example, in FIG. 4, if zone 1A to 8A has feed gas flow while zone 1B to 8B has no feed flow (i.e., are idle), then, the reactor effluent from zone 1A can recycle into the feed side of zone 1B. After passing through zone 1B, the effluent will flow to the downstream heat exchanger(s). The same arrangement for recycling the reactor effluent may be set up for zones 2A/2B, 3A/3B, . . . 8A/8B. In this example, center zone 9 will be the last one with no flow. If the water electrolysis system does not produce enough hydrogen to operate 50% of the zones in the dynamic reactor, a bleed stream (which is a diverted minimal amount of the feed gas), CO or a reducing agent will be supplied to the zones with no feed gas flow and the CO or reducing agent will recycle from bottom of one zone back to the top of another zone since there is little or no reaction happening in these zones. For example, if zone 1A to 8A, and 1B has no feed flow, CO or reducing agent may be supplied to pass through zones 1A to 8A and 1B to preserve the catalyst activity.

Figure 10:
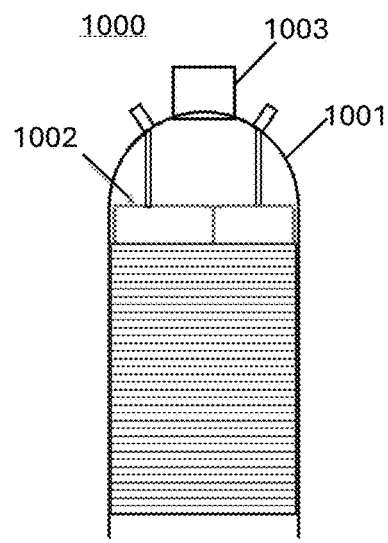
FIG. 10 is an example of a gas feed distributor with sealed distribution boxes at the top of a dynamic reactor.

FIG. 10 depicts an example of a gas feed distributor 1001 at the top of a dynamic reactor 1000. In this embodiment, the gas feed distributor includes a removable top plate 1002 for catalyst loading and changing, and a manhole 1003 for the operator to enter and inspect the dynamic reactor, and load and discharge catalyst, when needed.

Figure 11A:
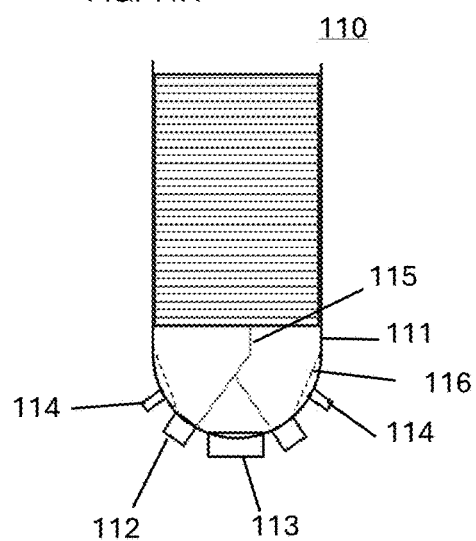
FIGS. 11A and 11B are examples of an effluent collector at the bottom of a dynamic reactor having four zones.
Figure 11B:
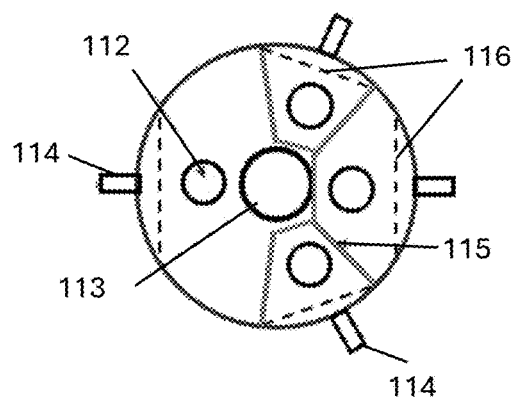

FIG. 11A depicts an example of an effluent collector 111 at the bottom of a dynamic reactor 110. In this embodiment, the effluent collector includes a catalyst discharge nozzle 112, the bottom of the manhole 113, and an effluent outlet nozzle 114 protruding from each zone. FIG. 11B is a cross-sectional view of the effluent collector shown in FIG. 11A. A screen plate 116 in FIGS. 11A and 11B is placed in front of each of the reactor effluent nozzles 114 to prevent catalyst or inert particles from getting into the effluent nozzle 114 and associated feed line. The separating sheets 115 are also depicted.

Figure 9:
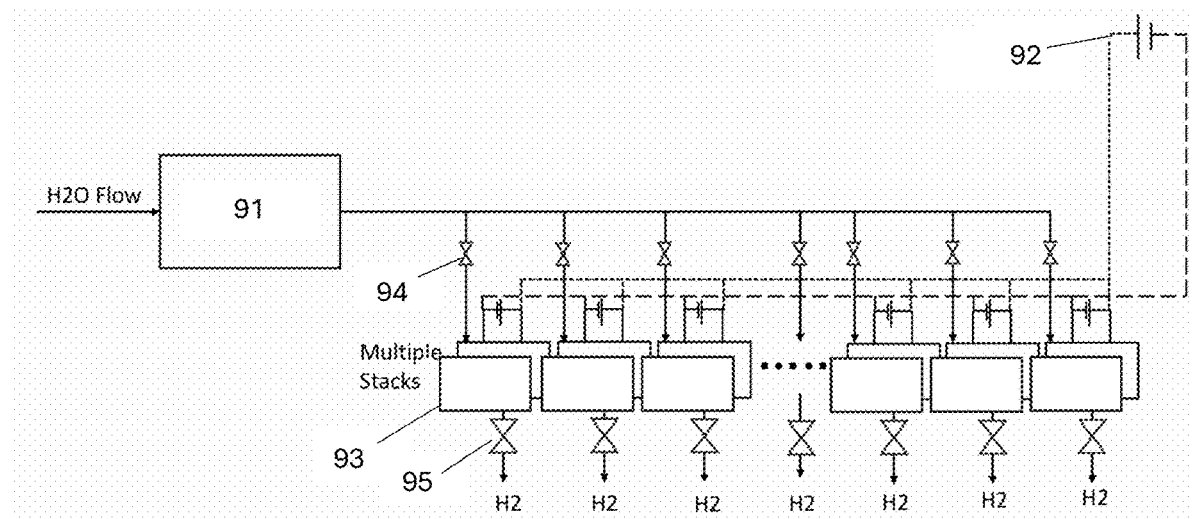
FIG. 9 is a schematic diagram showing the configuration of an example of a water electrolysis system to make green hydrogen.

A non-limiting example of a water electrolysis system utilized with the systems disclosed herein is shown in FIG. 9. FIG. 9 shows the configuration of a water electrolysis system to make green hydrogen, including water flow, a water storage tank 91, and a renewable power source 92, which generates direct current electricity through the power lines. The direct current electricity is supplied to the water electrolysis system, which is designed in this example to have at least 7 stacks of water electrolysis cells 93. The multiple stacks may be turned on or shut down depending on the amount of electricity provided to the electrolysis system. Valves 94 are included to control the flow and shut off of electricity. Valves 95 are included to control the flow and shut off of hydrogen.

Figure 12:
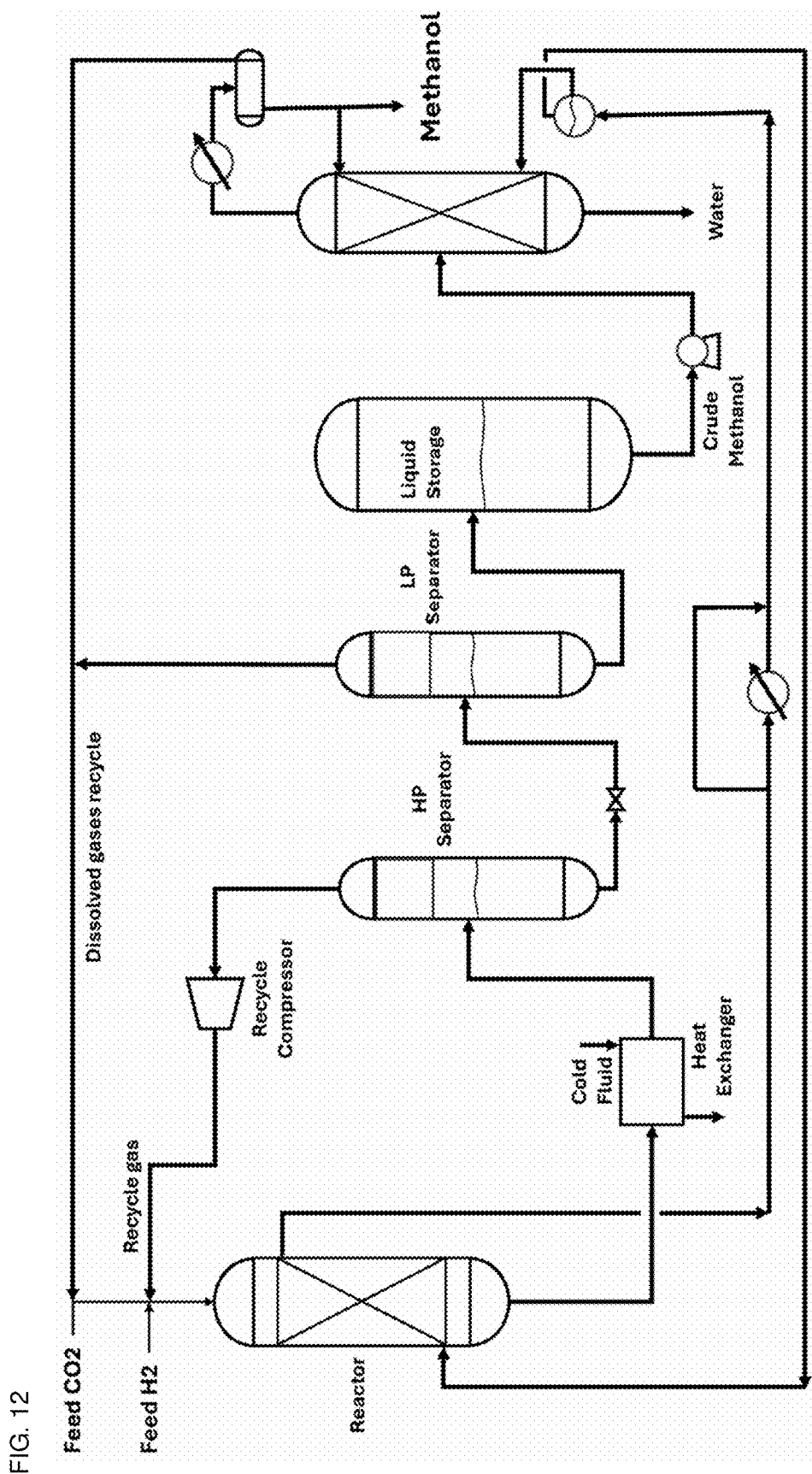
FIG. 12 is an example of the system of FIG. 7 in combination with a steady-state methanol production process, which includes distillation columns.
Figure 13:
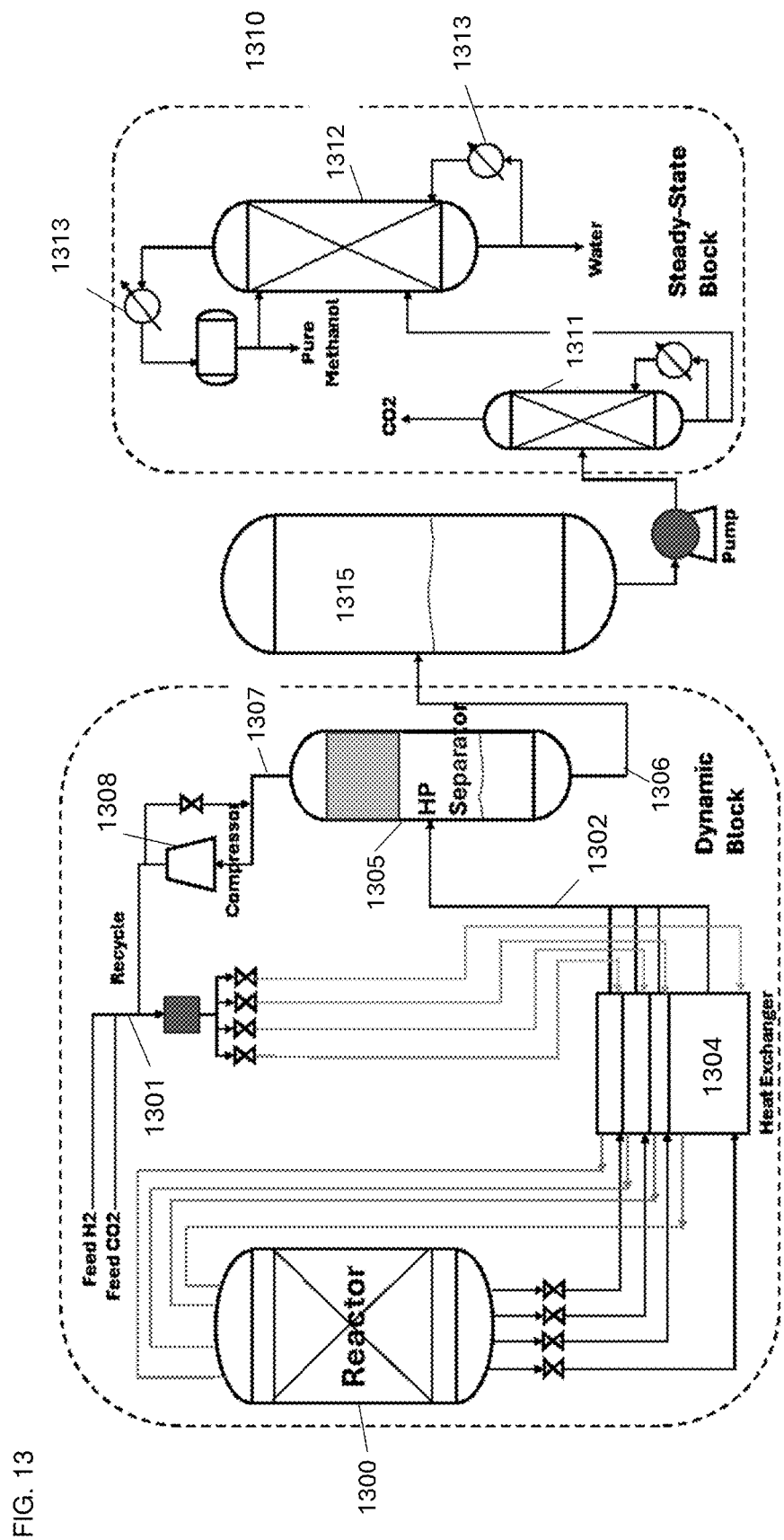
FIG. 13 is another arrangement of a system of FIG. 7 in combination with a steady-state methanol production process, which includes distillation columns.

FIGS. 12 and 13 are examples of a carbon conversion system disclosed herein supplying liquid product to a steady-state system for methanol synthesis. As depicted in the figure, the system of FIG. 7 is arranged in combination with a conventional system for methanol purification. In FIG. 13, a dynamic block system comprising the dynamic reactor 1300 and the heat exchanger 1304, is connected to a methanol purification system 1310, with a liquid storage system containing crude methanol and water therebetween. The separator 1305 separates the cooled reactor effluent 1302 into a liquid product stream 1306 and a gas stream 1307. The gas stream 1307 is sent through a compressor 1308 and recycled by combining with the feed gas stream 1301. After leaving the separator 1305, the liquid product 1307 is directed to a liquid storage system. The liquid storage system is shown here as a single storage tank 1315; however, it is envisioned that the liquid storage system may include any number of storage tanks, and/or that the liquid product may be split into any number of streams before being directed to a storage system, steady-state system, or otherwise. The dynamic reactor 1300, heat exchanger 1304, compressor 1308, and separator 1305, along with the feed gas stream 1301 and reactor effluent stream(s) 1302 from the dynamic reactor will be in a dynamic mode, while the methanol purification system will be operated at steady-state mode. As shown in the figure, the methanol purification system 1310 includes a stripper or stripping column 1311, a methanol column 1312, and heater/coolers 1313, the combination and modifications of which will be readily understood by one of ordinary skill in the art.

FIG. 14 is an example of a carbon conversion system disclosed herein, which is configured to produce a liquid product and a light hydrocarbon absorbed liquid product to a steady-state system for synthetic fuel production. This system includes a high-pressure separator 1405, which separates the cooled reactor effluent 1402 into the liquid product 1406 and a gas stream 1407. The liquid product 1406 is directed to a liquid storage system shown here as a single storage tank 1415; however, it is envisioned that the liquid storage system may include any number of storage tanks, and/or that the liquid product may be split into any number of streams before being directed to a storage system, steady-state system, or otherwise. The gas stream 1407 is directed to an absorber system, here containing two absorbers 1409; however, it is envisioned that the absorber system may include one absorber, three absorbers or more than three absorbers. When there are multiple absorbers present, they may operate in a dynamic mode such that one or two remains idle while the other is in operation, and vice versa to accommodate the flow of the gas stream, which is dependent on the hydrogen production and supply to the dynamic reactor. A light hydrocarbon absorbed liquid product exits the absorber and is directed to a second liquid storage tank 1410. In FIG. 14, a dynamic block system comprising the dynamic reactor 1400, the heat exchanger 1404, separator 1405, and absorbers 1409, is connected to a SAF production system including, in part, a liquid storage tank containing $C_{5+}$ hydrocarbons 1415, a second liquid storage tank comprising condensed $C_{2-5}$ hydrocarbons 1410, a naphtha recovery column and other downstream processing systems (e.g., reactors, separators, absorbing beds, or any combination thereof, the combinations of which will be readily understood by one of ordinary skill in the art) (not shown), and a naphtha storage tank 1416. While the figures include two liquid storage tanks and one naphtha storage tank, any number of storage tanks may be envisioned as needed to store and support the other systems connected thereto. A valve system 1421 is included that controls the feed gas flow rate to the dynamic reactor.

While specific embodiments of the subject invention have been discussed, the above specification is illustrative and not restrictive. Many variations of the invention will become apparent to those skilled in the art upon review of this specification and the claims below. The full scope of the invention should be determined by reference to the claims, along with their full scope of equivalents, and the specification, along with such variations.

What is claimed:

1. A system for catalytic carbon conversion comprising:
   a. a dynamic catalytic conversion reactor comprising:
      an outer wall having an inner portion filled with a plurality of tubes arranged in parallel to the longitudinal axis of the outer wall;
      a catalyst within each of the plurality of tubes; and
      one or more separating sheets within the outer wall, wherein the one or more separating sheets divide the inner portion of the outer wall into a plurality of zones, and
      wherein each of the plurality of zones comprises a portion of the plurality of tubes;
   b. one or more heat exchangers coupled to the dynamic catalytic conversion reactor, and configured to receive a reactor effluent produced by the dynamic catalytic conversion reactor;
   c. a separator coupled to the one or more heat exchangers;
   d. one or more compressors coupled to the separator;
   e. a carbon source gas configured for supply to the dynamic catalytic conversion reactor; and
   f. a hydrogen source coupled to a renewable energy supply configured for supply to the dynamic catalytic conversion reactor.

2. The system for catalytic carbon conversion of claim 1, wherein the renewable energy supply comprises a water electrolysis system.

3. The system for catalytic carbon conversion of claim 2, wherein hydrogen generated by the water electrolysis system and the carbon source gas combine to form a feed gas for supply to the dynamic reactor.

4. The system for catalytic carbon conversion of claim 1, further comprising a liquid storage system coupled to the separator and configured to receive a liquid product from the separator.

5. The system for catalytic carbon conversion of claim 1, wherein the carbon source gas comprises $CO_2$, and wherein the system affords catalytic $CO_2$ conversion.

6. A method for catalytic $CO_2$ conversion comprising:
(i) supplying a feed gas into one or more of a plurality of zones in a dynamic catalytic conversion reactor, the dynamic catalyst conversion reactor comprising:
an outer wall having an inner portion filled with a plurality of tubes arranged in parallel to the longitudinal axis of the outer wall;
a catalyst within each of the plurality of tubes; and
one or more separating sheets within the outer wall,
wherein the one or more separating sheets divide the inner portion of the outer wall into the plurality of zones, and
wherein each of the plurality of zones comprises a portion of the plurality of tubes,
wherein the feed gas comprises a carbon source gas comprising $CO_2$, and hydrogen gas;
(ii) contacting the feed gas and the catalyst in the feed gas zones to cause a $CO_2$ conversion reaction; and
(iii) producing a reactor effluent from the $CO_2$ conversion reaction.

7. A method of preserving catalyst activity within a dynamic catalytic conversion reactor comprising:
an outer wall having an inner portion filled with a plurality of tubes arranged in parallel to the longitudinal axis of the outer wall;
a catalyst within each of the plurality of tubes; and
one or more separating sheets within the outer wall,
wherein the one or more separating sheets divide the inner portion of the outer wall into a plurality of zones, and
wherein each of the plurality of zones comprises a portion of the plurality of tubes,
the method comprising:
supplying a feed gas into one or more of the plurality of zones in the dynamic catalytic conversion reactor, wherein the feed gas comprises hydrogen gas;
contacting the feed gas and the catalyst within the plurality of tubes in the feed gas zone to cause a chemical reaction; and
supplying either: i) one or more gases into one or more idle zones in the dynamic catalytic conversion reactor that are not supplied with the feed gas; or ii) one or more bleed streams from the feed gas into one or more idle zones in the dynamic catalytic conversion reactor that are not supplied with the feed gas.

8. The system for catalytic carbon conversion of claim 1, wherein the dynamic catalytic conversion reactor further comprises a top tube sheet and a bottom tube sheet within the outer wall; and
wherein each of the plurality of tubes has a top end and a bottom end; and wherein the top end of the plurality of tubes is coupled to the top tube sheet and the bottom end of the plurality of tubes is coupled to the bottom tube sheet.

9. The system for catalytic carbon conversion of claim 8, wherein the separating sheets extend from the top tube sheet to the bottom tube sheet.

10. The system for catalytic carbon conversion of claim 1, wherein the dynamic catalytic conversion reactor includes 1 to about 31 separating sheets.

11. The system for catalytic carbon conversion of claim 1, wherein each of the plurality of zones is sealed at the top and the bottom of the dynamic catalytic conversion reactor to prevent any leakage between said zones.

12. The system for catalytic carbon conversion of claim 1, wherein the dynamic catalytic conversion reactor further comprises a heat transfer medium within the plurality of zones and between the plurality of tubes.

13. The system for catalytic carbon conversion of claim 12, wherein the heat transfer medium is selected from the group consisting of steam, molten salt, and hot oil.

14. The system for catalytic carbon conversion of claim 1, wherein the separating sheets divide the inner portion into 2 to 40 zones, and wherein the zones are not all of the same size.

15. The method for catalytic $CO_2$ conversion of claim 6, wherein the dynamic catalytic conversion reactor includes 1 to about 31 separating sheets.

16. The method for catalytic $CO_2$ conversion of claim 6, wherein each of the plurality of zones is sealed at the top and the bottom of the dynamic catalytic conversion reactor to prevent any leakage between said zones.

17. The method for catalytic $CO_2$ conversion of claim 6, wherein the dynamic catalytic conversion reactor further comprises a heat transfer medium within the plurality of zones and between the plurality of tubes.

18. The method for catalytic $CO_2$ conversion of claim 17, wherein the heat transfer medium is selected from the group consisting of steam, molten salt, and hot oil.

19. The method for catalytic $CO_2$ conversion of claim 6, wherein the separating sheets divide the inner portion into 2 to 40 zones, and wherein the zones are not all of the same size.

20. The method of preserving catalyst activity of claim 7, wherein the dynamic catalytic conversion reactor includes 1 to about 31 separating sheets.

21. The method of preserving catalyst activity of claim 7, wherein each of the plurality of zones is sealed at the top and the bottom of the dynamic catalytic conversion reactor to prevent any leakage between said zones.

22. The method of preserving catalyst activity of claim 7, wherein the dynamic catalytic conversion reactor further comprises a heat transfer medium within the plurality of zones and between the plurality of tubes.

23. The method of preserving catalyst activity of claim 22, wherein the heat transfer medium is selected from the group consisting of steam, molten salt, and hot oil.

24. The method of preserving catalyst activity of claim 7, wherein the separating sheets divide the inner portion into 2 to 40 zones, and wherein the zones are not all of the same size.

* * * * *